United States Patent
Yu et al.

(10) Patent No.: US 7,974,536 B2
(45) Date of Patent: * Jul. 5, 2011

(54) SYSTEM AND METHOD FOR PRE-CONFIGURING AND AUTHENTICATING DATA COMMUNICATION LINKS

(75) Inventors: Huinan Yu, Kildeer, IL (US); Aroon V. Tungare, Winfield, IL (US); John R. St. Peter, Elburn, IL (US); Arnold Sheynman, Northbrook, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 726 days.

This patent is subject to a terminal disclaimer.

(21) Appl. No.: 11/851,086

(22) Filed: Sep. 6, 2007

(65) Prior Publication Data

US 2009/0067846 A1  Mar. 12, 2009

(51) Int. Cl.
*H04B 10/00* (2006.01)
(52) U.S. Cl. ........ 398/115; 398/107; 398/108; 398/128; 398/130
(58) Field of Classification Search .............. 398/115, 398/116, 108, 107, 106, 109, 112, 118, 127, 398/128, 130, 135, 138, 25, 33
See application file for complete search history.

(56) References Cited

U.S. PATENT DOCUMENTS

| | | |
|---|---|---|
| 5,239,295 A | 8/1993 | DeLuca et al. |
| 5,701,189 A | 12/1997 | Koda et al. |
| 6,014,236 A | 1/2000 | Flaherty |
| 6,563,619 B1 | 5/2003 | Hirayama et al. |
| 6,685,093 B2 | 2/2004 | Challa et al. |
| 6,720,863 B2 | 4/2004 | Hull et al. |
| 6,985,069 B2 | 1/2006 | Marmarpopulos |
| 7,028,906 B2 | 4/2006 | Challa et al. |
| 7,047,560 B2 | 5/2006 | Fishman et al. |
| 2002/0065065 A1 | 5/2002 | Lunsford et al. |
| 2003/0050009 A1 | 3/2003 | Kurisko et al. |
| 2005/0094838 A1 | 5/2005 | Tomoda et al. |
| 2006/0056855 A1 | 3/2006 | Nakagawa et al. |

(Continued)

FOREIGN PATENT DOCUMENTS

EP   1564914 A1   8/2005

(Continued)

OTHER PUBLICATIONS

McCune et al., "Seeing-Is-Beleving: Using Camera Phones for Human-Verifiable Authentication," Proceedings of the 2005 IEEE Symposium on Security and Privacy (S&P'05), May 8-11, 2005, pp. 110-124.

(Continued)

*Primary Examiner* — M. R. Sedighian
(74) *Attorney, Agent, or Firm* — Yudell Isidore Ng Russell, PLLC; Sylvia Chen

(57) ABSTRACT

An electronic device includes a data processor and data communication mechanism for: (a) transmitting, via an optical link, configuration and authentication requests/information for a second data communication link to an external device; and (b) transmitting other content data via the separate, second data communication link that is configured using the configuration data transmitted on the optical link. Data communication on the optical link is provided via modulated optical pulses from an illumination light source of the electronic device. The light source is selectively utilized for illuminating a component in the electronic device and for transmitting configuration/authentication data via optical pulses. An optical receiver also receives optically transmitted configuration/acknowledgement data from the external device.

23 Claims, 12 Drawing Sheets

U.S. PATENT DOCUMENTS

| | | | |
|---|---|---|---|
| 2006/0256070 A1* | 11/2006 | Moosavi et al. | 345/104 |
| 2007/0024571 A1 | 2/2007 | Maniam et al. | |
| 2007/0116293 A1 | 5/2007 | Busser et al. | |
| 2008/0238725 A1 | 10/2008 | Gitzinger et al. | |
| 2008/0247759 A1 | 10/2008 | Bahar | |

FOREIGN PATENT DOCUMENTS

| | | |
|---|---|---|
| EP | 1724951 A1 | 11/2006 |
| EP | 1811715 A1 | 7/2007 |
| JP | 402131633 | 5/1990 |
| WO | 2002-084635 A1 | 10/2002 |
| WO | 2007-037122 A1 | 3/2007 |

OTHER PUBLICATIONS

Marlene Benigar, "International Search Report and Written Opinion," WIPO, ISA/EPO, Oct. 15, 2008.

International Search Report and Written Opinion, PCT/US2008/059818, EPO, Jul. 14, 2008.

\* cited by examiner

# SYSTEM AND METHOD FOR PRE-CONFIGURING AND AUTHENTICATING DATA COMMUNICATION LINKS

RELATED APPLICATIONS

The present application is related to the following co-pending U.S. patent applications filed on Apr. 13, 2007. The content of these applications is incorporated herein by reference in their entirety: Ser. No. 11/735,217, entitled "Communicating Information Using An Existing Light Source Of An Electronic Device;" and Ser. No. 11/735,197, entitled "Synchronization And Processing Of Secure Information Via Optically Transmitted Data."

BACKGROUND OF THE INVENTION

1. Technical Field

The present invention relates generally to electronic devices and in particular to data transmission from electronic devices. Still more particularly, the present invention relates to data transmission from electronic devices with an embedded light source.

2. Description of the Related Art

Portable electronic devices, such as mobile (or cellular) phones, have become standard equipment used by a growing number of people throughout the world for voice communication. In addition to providing voice communication, a large number of portable electronic devices now offer data communication and multimedia functions. Due to the extremely high penetration rate of these electronic devices, developers continue to expand the capabilities of the devices to perform other user-desired functions.

One growing need is to establish trusted communication links between electronic devices such that personal information, sensitive business information, copyrighted information, or privileged social group information can be transferred between the electronic devices using one of the communication links.

For example, in order to establish a trusted communication link for secure data transfer between two Bluetooth enabled devices, the two devices need to go through discovery and pairing procedures, which creates barriers for average consumers to use Bluetooth (BT) technology. Similarly, the set up of wireless connection using wireless LAN technology also requires at least some basic technical knowledge. The setup procedures are often not understood by the average, non-technical consumers.

A number of technologies have been developed to assist the establishment of secure communication links between electronic devices. One method involves purposely reducing communication power levels during Bluetooth paring process to avoid information interception. However, it is not intuitive for users to adjust the range differences needed during paring and data transfer. Another method uses Infrared Data Association (IrDA) link as a third channel for BT paring. This method requires the same electronic device to be equipped with both Bluetooth and IrDA transceivers. Another method uses the mobile device camera and 2D barcode to assist in the authentication process. This method suffers from several deficiencies including: (1) the method is not convenient to use; (2) the method is not intrinsically a two directional communication method; and (3) the method's encryption key length is limited by the video capture frame rate and resolution of the device's LCD display. Yet another method uses Near Field Communication (NFC) to establish fast and easy Bluetooth paring. However, this approach requires mobile devices that are both Bluetooth and NFC enabled. Furthermore, although being in close proximity improves data transfer security, the broadcast nature of radio frequency (RF) wireless communication makes it possible for data to be sniffed with special equipment.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
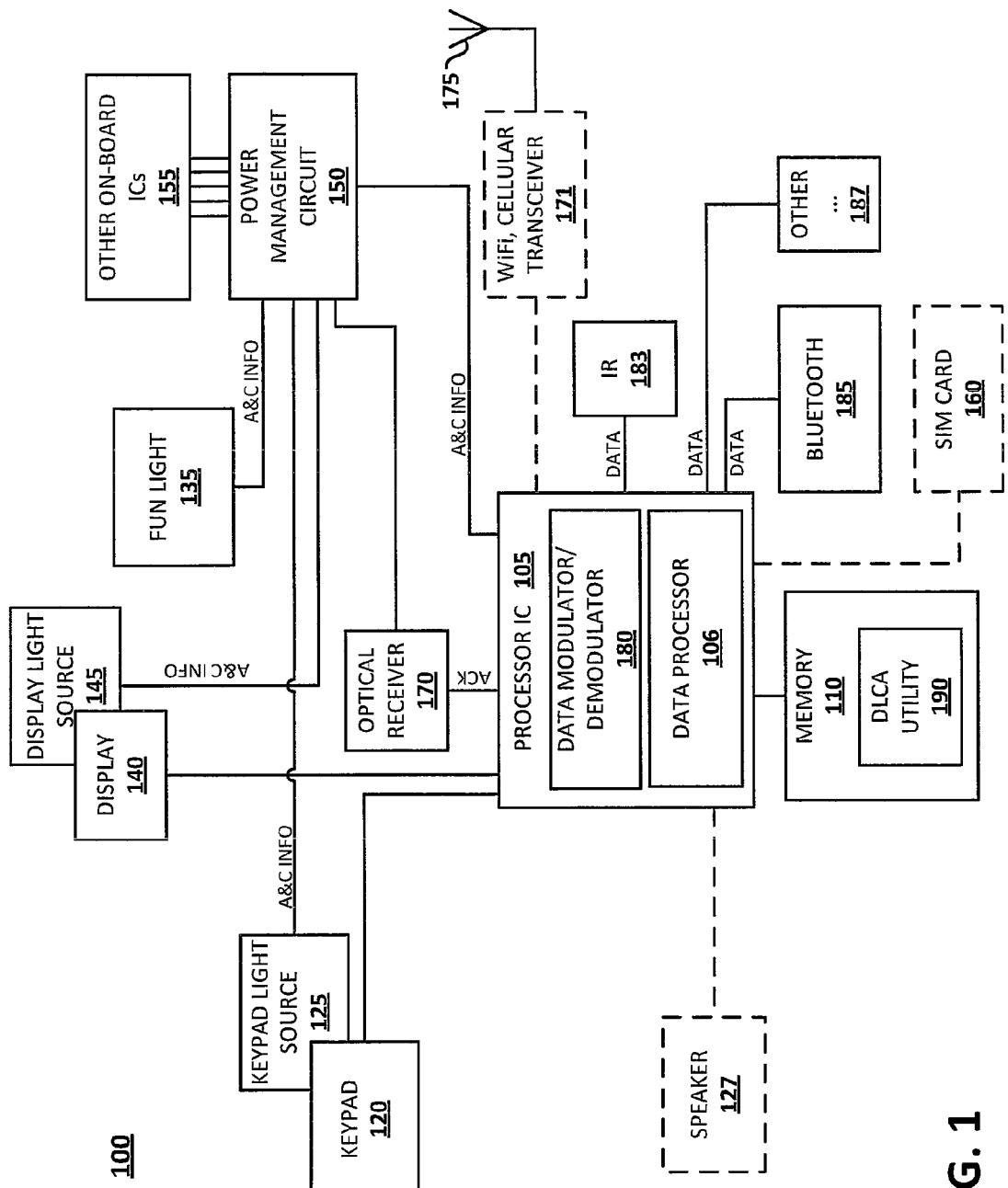
FIG. 1 is a block diagram illustrating an example electronic device, which includes components for enabling short range data communication via illumination light source of a display, keypad or fin light, as well as secondary data communication via a secondary link, in accordance with embodiments of the invention.

According to the illustrative embodiments, an electronic device includes a data processor and data communication mechanism for: (a) transmitting, via an optical link, configuration and authentication requests/information, and/or encryption information for a second data communication link to an external device; and (b) transmitting other content data via the separate, second data communication link that is configured using the configuration data transmitted on the optical link. The optical link of the electronic device includes an illumination light source for illuminating components within the electronic device and which provides modulated optical signals indicative of the data stream ("optically-transmitted data) generated from the data processor. A power management circuit is operatively connected to the data processor and to the illumination light source. The power management circuit selectively drives the illumination light source with power levels optimized for illuminating the components or with power level modulation indicative of the data stream generated from the data processor. The optical link of the electronic device also includes an optical receiver by which the electronic device receives modulated optical signals containing a data stream generated from another device.

Additionally, according to other embodiments, a method and device enables initial communication of authentication and configuration requests and data, and/or providing encryption information via optical pulses from a light source of an electronic device. A data transfer interface is provided to support processing of selected data by a processor of the electronic device. The electronic device comprises an illumination light source, which is selectively utilized for illuminating a component in the electronic device and for transmitting data via optical pulses. An optical receiver also receives optically transmitted data (as acknowledgements/responses to the authentication and configuration requests). The transmission and receiving of the authentication and configuration data is provided on a bidirectional duplex communication link created with a second optical receiver and an optical data transmission mechanism of a second electronic device.

In one embodiment, the electronic device includes a display, such as a liquid crystal display (LCD), and a display light source (often referred to as a backlight). In a next embodiment, the electronic device includes a group of fun-light LEDs that may be modulated to provide the optically-transmitted data. In yet another embodiment, the light source is a keypad light source, which illuminates the keypad of the electronic device when the keypad light source is utilized for illumination and which provides optically-transmitted data when the keypad light source is utilized for data communication/transmission. Another embodiment includes the optical modulation of light that is transmitted by a self-illuminating display of the electronic device. With this embodiment, the display is an emissive type and the light source is a part of the display rather than being a separate light source. In each embodiment, modulation of the light is provided by the power management circuit, which is operationally connected to the respective light source(s) and to the data processor of the electronic device.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to an electronic device, which is specifically illustrated as a mobile phone, it will be appreciated that the present invention can be applied to other devices such as MP3 players, personal multimedia players, PDAs (Personal Digital Assistants), and similar portable devices, and application of the invention is not limited to mobile phones.

Also, it is understood that the use of specific terminology and/or nomenclature are for example only and not meant to imply any limitations on the invention. The invention may thus be implemented with different nomenclature/terminology utilized to describe the various parameters/components/devices/utilities, without limitation. For example, the embodiments are generally described from the perspective of enabling transmission of authentication and/or configuration type data/information as optically-transmitted data. However, as utilized herein, the terms "configuration" and/or "authentication" when utilized to defined a type of "request" or "information" or "data" (or optically-transmitted data) respectively refer to any information that is representative/indicative of (a) routing configuration/set-up parameters, protocols, and/or methods, (b) security-related information, required to enable a second data communication link to be established, (c) encryption information required for decryption of data communicated via a second data communication link, and (d) token and/or pass code information required to enable the second electronic device to consume data communicated via a second communication link. The configuration and/or authentication request/data/information is described as being communicated on an optical link. Thus, the configuration and/or authentication request/data/information are provided by the processor of the device and utilized to modulate a light source, such that the modulated light source is transmitted via an optical link to an optical receiver of another device. This configuration and/or authentication request/data/information may then be deciphered at the receiving device when the light signal received on the optical link is de-modulated.

Other types of data (referred to herein as "content" data) are then transmitted via other communication links, established with the second device or with some other third device using the configuration and authentication data transmitted via the optical link. Thus, general use of the term "data," when not specifically defined as either configuration data or authentication data or both is thus intended to refer generally to any type of electronic information that may be transmitted via any medium, including via an optical link. For simplicity, when the data is specially being utilized during authentication and configuration processes, the data is specifically referred to as an authentication and configuration (A&C) request or A&C information, as defined herein. Also, for other types of data that may be transmitted via the optical link and/or the second communication link that is established using an optical link, such data is specifically referred to as content data, when utilized in that context.

Further, within the description of embodiments of the invention, the term modulating (or optically modulating) is utilized to generally refer to the process of changing one or more characteristics of a light source, such that the light signals emanating from the light source are representative/indicative of specific information provided by the data processor. The term may also refer to some form of encoding (e.g., optically encoding) or embedding of data within the light, which is accomplished by changing characteristics of (or modulating) the light source. De-modulation then refers to the reverse process of removing/interpreting the data from a received light that has been modulated to provide signals representing the original data that is optically-transmitted.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

Figure 2:
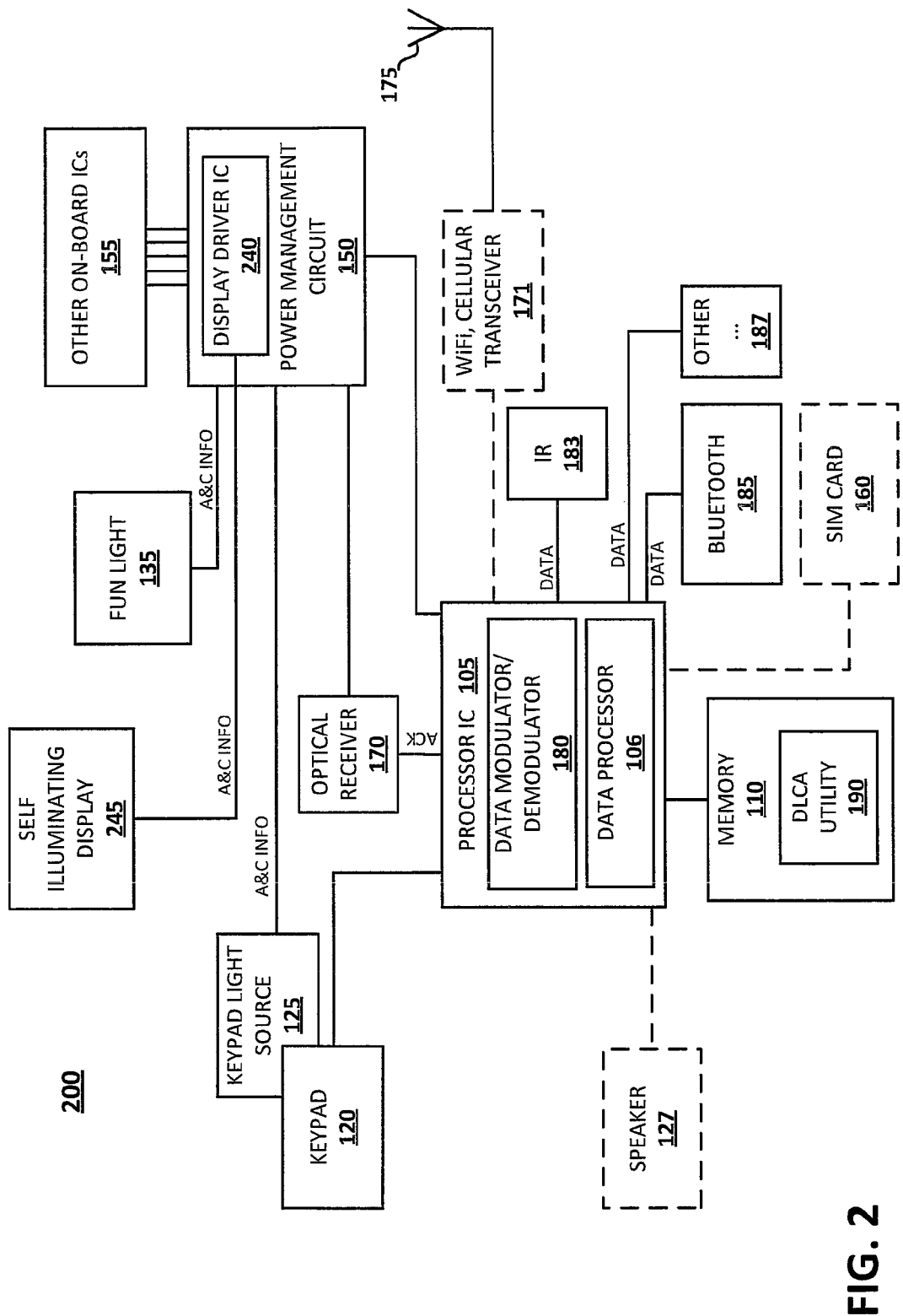
FIG. 2 is a block diagram illustrating an example electronic device, which includes components for enabling short range data communication via a self illuminating display, as well as secondary data communication via a secondary link, in accordance with one embodiment of the invention.

With reference now to the figures, FIGS. 1 and 2 are block diagram representations of an example electronic device, which is designed with the functional components (hardware and software/firmware) required to enable an illumination light source to be modulated to provide optical transmission of data (or a data stream) from the electronic device, in accordance with embodiments of the invention. Most of the components of FIGS. 1 and 2 are similar and thus the figures are described together. However, separate descriptions are provided where the components differ between the two illustrated devices. As will become clear in the following description, the primary distinctions in the two illustrations is the type of light source that is modulated to produce the optically modulated signals representing the data stream provided by the respective data processors.

As illustrated by FIGS. 1 and 2, electronic device 100/200 comprises processor integrated circuit (IC) 105, which is connected to memory 110. Processor IC 105 may include a programmable microprocessor (data processor 106), as well as a digital signal processor (DSP) that controls the communication and other functions/operations of electronic device 100/200. These functions/operations include, but are not limited to, data processing and signal processing, as initiated within electronic device 100/200. Additionally, the functions/operations of the programmable microprocessor (data processor 106) include the generation of: (1) a first stream of data (such as A&C information) on an optical link according to a first communication protocol and interface and triggering a modulation of a light source to generate optically-transmitted data, representative of the A&C information; and (2) a second different stream of data (such as content data) according to another communication protocol, which enables transmission of the content data on a second communication link using configuration settings for that second communication link received on the optical link. In one embodiment, the programmable microprocessor (data processor 106) also performs the functions of processing (1) signals received by the optical receiver, which signals contain optically-transmitted data generated at another device and (2) content data received by other types of receivers associated with the second communication link. To support both the data-to-light modulation and light-to-data demodulation functions, processor IC 105 comprises data modulator/demodulator 180.

Data modulator/demodulator 180 may be a hardware component or a software utility that operates along with the microprocessor and the power management circuit 150 to support the optical modulating functions on the provided data (or data stream). In one embodiment, data modulator/demodulator 180 is operatively coupled to a serial data communication interface of the data processor 106. Data modulation functions may be provided by a separate component from data processing functions, but are illustrated as combined within a single component (data modulator/demodulator 180) for ease of description. Data modulator/demodulator 180 is also operationally coupled to optical receiver 170 to support demodulation functions of optical receiver 170 on received light that is modulated to represent optically-transmitted data. It is appreciated that the functionality of data modulator/demodulator 180 may be provided as software code within one or more of the illustrated components to which data modulator/demodulator 180 is shown operationally connected. The specific illustration of the data modulator/demodulator 180 is thus not meant to imply any structural, functional or other limitations on the invention.

Processor IC 105 is coupled to power management circuit 150, which controls the allocation of electrical power to the various components of electronic device 100/200. Processor IC 105 receives electrical power via power management circuit 150, which couples to a power source, such as a battery or a charging circuit (not shown). Power management circuit 150 also provides electrical power to the various light sources, described below, as well as other on-board ICs 155.

Electronic device 100/200 also comprises input devices, of which keypad 120 is illustrated, connected to processor IC 105. In the illustrative embodiment, keypad 120 is illuminated by keypad light source 125, which is coupled to power management circuit 150. Additionally, electronic device 100/200 comprises output devices, which are each connected to processor IC 105 and to power management circuit 150. Specifically, electronic device 100 in FIG. 1 comprises funlight 135 and display 140, and display light source 145. Display 140 may be a transmissive display, or a transflective display, or a reflective display.

In one embodiment, display device 140 comprises a Liquid Crystal Display (LCD) having optical shutters that open and close specific pixels based on received display commands. The LCD may display a white screen during data transfer to maximize optical data transmission efficiency. LCD may also display monochrome patterns such as red, green and blue, when similar monochrome lights such as RGB (Red, Green & Blue) are provided in the display light source so that multiple data channels can be created and utilized for concurrent transmission of one or more data streams. In this embodiment, each primary color may be assigned to a different data stream, or alternatively, the same data stream may be transmitted via multiple different color sources at different frequencies and wavelengths. Features of the invention may also apply to a CLI (caller line identification) illumination light source, in an alternative embodiment.

Depending on the design of electronic device 100/200, keypad light source 125 and/or funlight 135 and/or display light source 145 may be one of (a) at least one point light source comprising light emitting diodes (LEDs), (b) a planar light source comprised of organic light emitting diodes (OLEDs), and (c) a planar light conduit optically coupled to the one or more point light sources. Other embodiments may provide for different display light sources. The light source for display 140 or keypad 120 could be illuminating from the back or from the front. In back illumination implementation, light transmitted from the display/keypad is used to communicate with an external device. In the front illumination implementation, light reflected or diffracted from the display/keypad is used to communicate with an external device. In one embodiment the same illumination light source illuminates both the display and keypad and/or communicates with an external device.

In several of the described embodiments, the light sources (125, 135, 145) comprise a plurality of LEDs, which may be individually powered on/off and range in intensity based on the amount of power applied by power management circuit 150, when the device is in optical data communication mode. The plurality of LEDs may also be used to provide optimum illumination condition for display, keypad or funlight functions, when the device is not in the optical data communication mode. The microprocessor within processor IC 105 generates control signals that trigger certain responses by power management circuit 150, such as controlling the amount of power to apply to the light source (e.g., display light source 145) and/or which LEDs within the light source (145) to illuminate.

With these implementations, the light sources (125, 135, 145) are utilized for both illumination functions and communication functions. The described embodiments thus expand the functionality of a conventional illumination light source to serve as part of an optical data communication interface.

Keypad light source 125, funlight 135, and display light source 145 are light sources, which selectively illuminate the respective components (keypad 120 and display 140) when electrical power is supplied to the particular light source by the power management circuit 150. Further, the intensity of the illumination by each of the light sources is dependent on the amount (or level) of electrical power supplied by the power management circuit 150. Power management circuit 150 includes switching mechanism (described below), which enables power management circuit 150 to selectively drive the illumination light source with (1) power levels optimized for illuminating the particular display (or keypad) or (2) power level modulation, which generates optically modulated light that is indicative or representative of a data stream generated from the data processor IC 105.

Different from electronic device 100 (FIG. 1), electronic device 200 (FIG. 2) comprises self illuminating display 245, rather than a display (140) and separate display light source (145) as provided with electronic device 100 (FIG. 1). Self illuminating display 245 are emissive displays in which every display pixel emits light and can be controlled to turn on and off to form desired graphical patterns. Examples of self-illuminating displays include Organic Light Emitting Diode (OLED) display, Nano-emissive display (NED), or plasma display. Self illuminating display 245 is connected to power management circuit 150 via display driver IC 240, which is a part of power management circuit 150. Power management circuit 150 controls the amount of electrical power supplied to self illuminating display 245 via display driver IC 240, when the electrical power is supplied, as well as the length/duration of time the electrical power is supplied.

As illustrated, electronic device 100/200 further comprises optical receiver 170 by which electronic device 100/200 receives light, which has been modulated to include optically-transmitted data. Optical receiver 170 is a photo detector, which typically includes a photodiode, amplifier, demodulator and optics. The optical receiver 170, in conjunction with the microprocessor and the data modulator/demodulator 180, enables completion of demodulation functions, including: (1) receiving light that includes optically-transmitted data; and (2) demodulating the received light to extract the transmitted data; and (3) removing noise from optical or electrical sources. As described in greater detail below, the light that includes the optically-transmitted data is received from another (external) device, which may be similarly configured to electronic device 100/200 and which together with electronic device 100/200 establishes an optical communication data link.

The various input and output devices allow for user interfacing with electronic device 100/200. In addition to the above components, electronic device 100 may also include other components utilized to enable standard voice or other form of content data communication from/to electronic device 100/200. Among these components are transceivers 171, which are connected to antenna 175 to enable communication of radio frequency (RF) signals from and to electronic device 100/200. When electronic device 100/200 is a cellular phone, some of the received RF signals may be converted into audio which is outputted via speaker 127 during an ongoing voice communication. Also illustrated as example data communication components are infrared (IR) transceiver 183, Bluetooth transceiver 185, and other data communication module(s) 187. As indicated with the figures, each of these components transmit/receive content data, while the various light sources transmit/receive authentication and configuration requests and information.

It should be noted that the optical transmission features that are illustrated and described herein enable creation of an optical link and transmission of content data on that optical link, in addition to the transmission of configuration and authentication data. Use of specific illustrations and descriptions thereof of the optical transmission functionality being utilized to transmit A&C information is not meant to imply any limitations on the invention. Those skilled in the art would therefore appreciate the ability to extend the optical transmission functions of the devices to also permit transmission of any type of content data.

Electronic device 100/200 may be a global system for mobile communication (GSM) phone and thus includes a Subscriber Identity Module (SIM) card 160, which connects to processor IC 105 via a SIM adapter/port (not shown). SIM card 160 may be utilized as a storage device for storing data that is eventually transmitted as optically-transmitted data using the features of the invention as described herein. The data may also be stored within memory 110.

In addition to the above hardware components, several functions of electronic device 100/200 and specific features of the invention may be provided as functional code that is stored within memory 110 and executed by the microprocessor (or data processor) on processor IC 105. The microprocessor executes various functional code/firmware (e.g., data link configuration and authentication—DLCA—utility 190) to provide processor-level control for initiating/triggering the modulation of the light source with A&C information and transmission/projection of the modulated light, as described in greater details below. DLCA utility 190 may include therein code for implementing data modulator/demodulator 180, when data modulator/demodulator 180 is a software construct.

Figure 11:
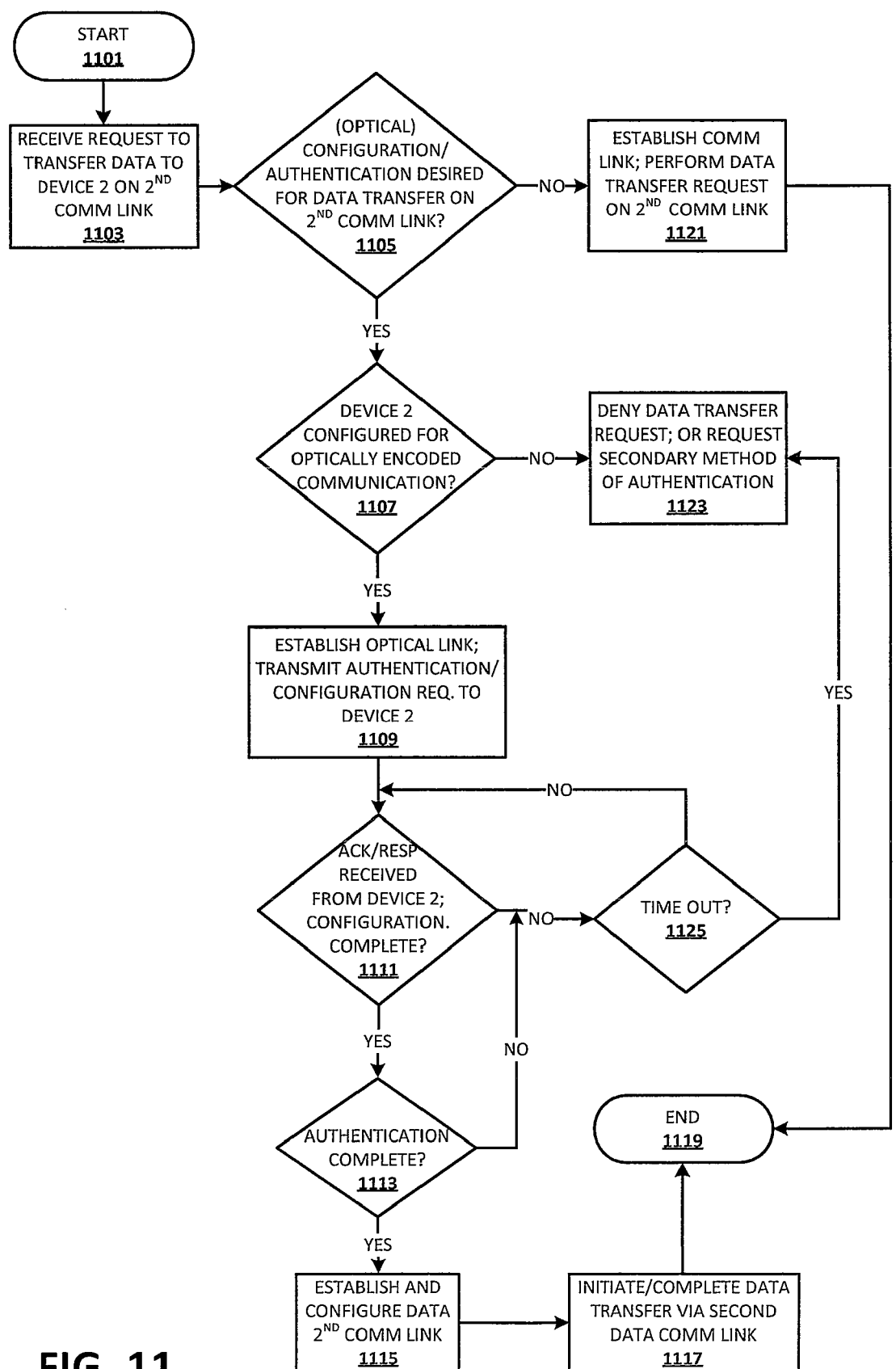
FIG. 11 is a flow chart illustrating the processing involved in performing authentication and configuration of a second data communication link utilizing an optical link with duplex optical communication, in accordance with an embodiment of the invention.

Additionally, in one embodiment, DLCA utility 190 also provides the following functions, among others: (1) displaying within menu options of the electronic device a specific option that triggers the activation of the optical modulation features of the electronic device 100/200; (2) receiving a user selection of the specific menu option and responding by signaling the data processor to (a) provide the A&C request/information and subsequently the content data to the data modulator/demodulator 180 and (b) trigger the switching mechanism of the power management circuit 150 to change operational modes to a A&C information communication mode and then a content data communication mode; (3) providing/identifying selected A&C information (including encryption/decryption information) for the generation of optically-transmitted data and providing/identifying specific content data to transmit via the second communication link; (4) confirming authentication information received in response to the A&C information; (5) completing configuration/set-up of the second communication link; and (6) select and schedule content data for transmitting on a second communication link. DLCA utility 190 may also assist in authentication or authorization process prior to data communication via both the optical communication link and the second data communication link. These functions and others represent the method processes of the invention, which are illustrated by FIG. 11, described below.

When a user of the electronic device desires to transmit information (such as an A&C request) via the illumination light source, the user first activates the data transfer function via a software or hardware trigger. In one embodiment, activation involves accessing the feature via the menu options of the electronic device, where a function for enabling optical modulation of light to enable data transfer is provided as a selectable option within the menu offerings. In another embodiment, the electronic device is designed with an optical data transmit button. Alternatively, the electronic device may be provided the software functionality to set up an optical data transmit button by defining an existing button to automatically activate that feature when depressed. Once the activation is complete, the user selects the appropriate A&C information to be transmitted (or the information may be pre-selected prior to activation) and brings the visible light source (e.g., display screen) of the communication device in close vicinity (at a substantially direct line of sight propagation) of the optical receiver of another device or a dedicated optical receiver.

Notably, one implementation restricts the data transmitting features to only authenticated users of the portable electronic device and/or authenticated devices. Thus, a security feature is added to the device to prompt the user for prior authentication (e.g., a password entry) before data is allowed to be optically transmitted from the portable electronic device. An authentication procedure is provided with pre-established authentication parameters required to be entered prior to switching the device to data transmission mode. In one embodiment, another security features that is added to the device includes requiring the electronic device to receive an authentication confirmation from an external device using the optical data link before information (e.g., A&C information and/or content data) is allowed to be transmitted on the optical link or via another link from the external device. Methods of authentication include the use of passcodes and the use of biometric sensing functions, among others.

Those of ordinary skill in the art will appreciate that the hardware depicted in FIGS. 1 and 2 may vary depending on implementation. Other internal hardware or peripheral devices may be used in addition to or in place of the hardware depicted in FIGS. 1 and 2. Also, the processes of the present invention may be applied to any portable/handheld electronic device or data processing system or similar device with a light source that may be modulated by a power management circuit. Thus, the depicted example is not meant to imply architectural limitations with respect to the present invention.

The following Section A of the application describes in detail the implementation of optical data transmission via data modulation of light from an existing light source. The functionality described herein is provided within the co-pending applications, which have been incorporated herein for reference. Features, which relate specifically to the present invention are introduced within Section B and specifically the description of FIGS. 9-11. Section C then describes various implementations of configured and/or authenticated second communication links enabling data transfer between the second device of the optical link and other devices.

Figure 5:
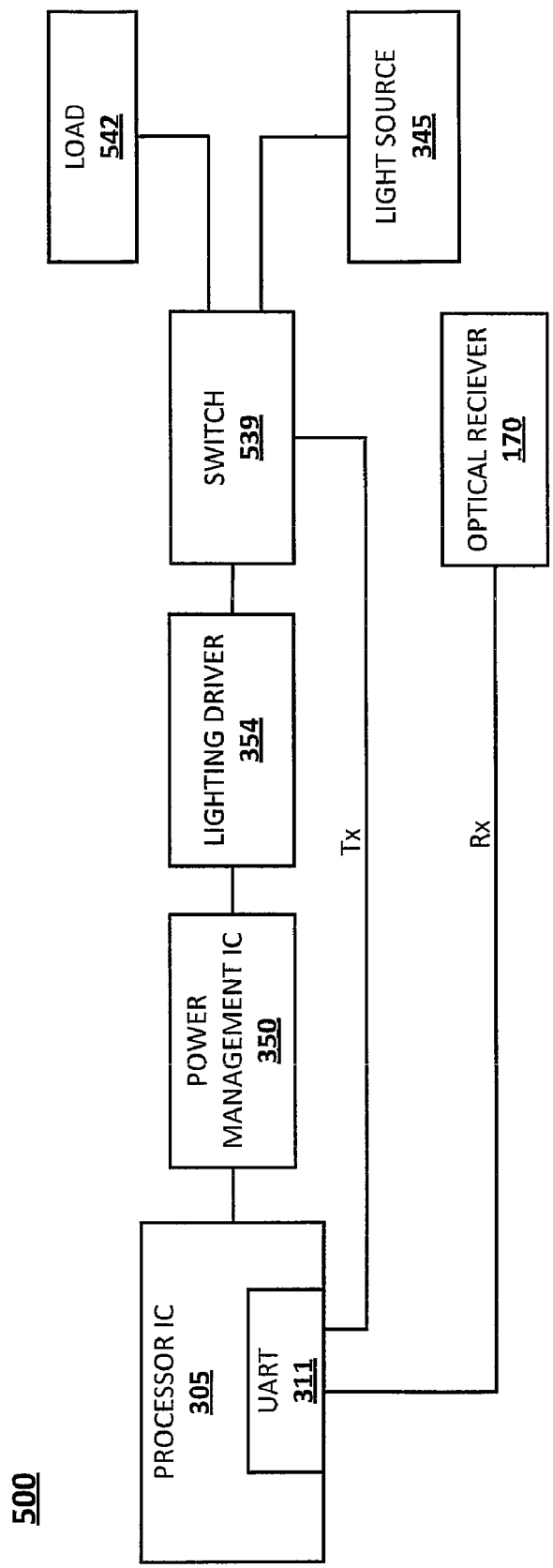
FIGS. 5 and 6 provide block diagram representations of two alternative driver configurations by which optically-transmitted data may be generated for transmission, in accordance with embodiments of the invention.
Figure 6:
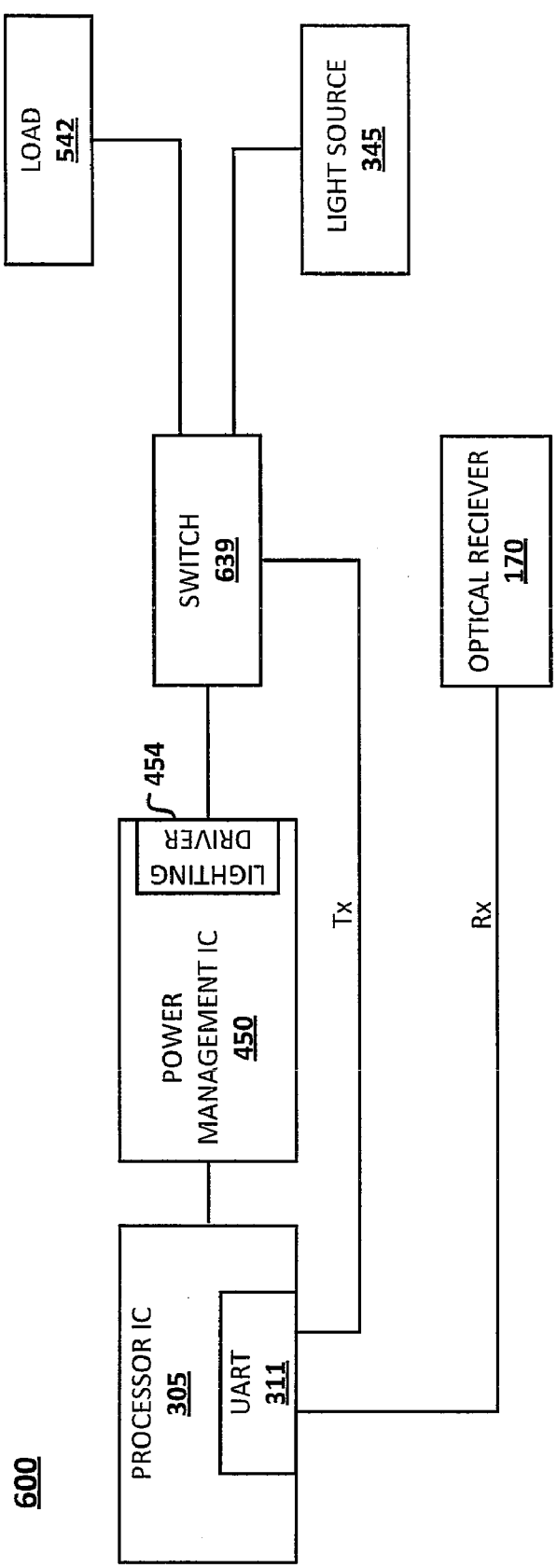

A. Modulation of Illumination Light Source for Optically-Encoded Data Transmission According to the described embodiments of the invention, the power management circuit 150 is expected to be able to switch at relatively high frequencies (e.g., 500 kHz or 1 Mbps—megabits per second—data rate) than the frequencies commonly used for pulse width modulation (PWM) of light sources to enable the transfer of data files between electronic devices. Several different driver options are provided to support/enable this high frequency switching requirement, which is not supported by conventional device configurations. These driver options are illustrated by FIGS. 3 through 6, with FIGS. 3 and 4 depicting embodiments with the light source driver providing the switching frequency, and FIGS. 5 and 6 depicting embodiments with a separate switch mechanism and a connected load.

Figure 3:
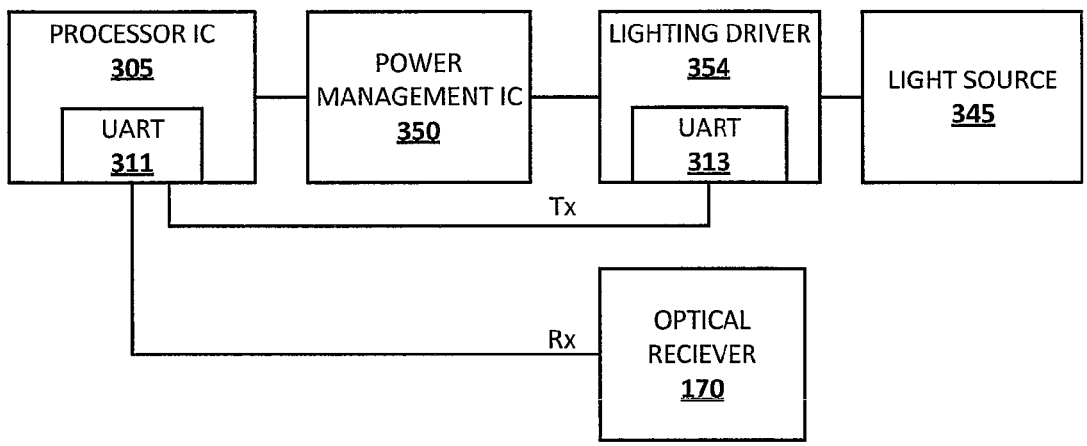
FIGS. 3 and 4 provide block diagram representations of driver configurations by which modulated optical signals representing data ("optically-transmitted data") may be generated for transmission by a light source of an electronic device in accordance with embodiments of the invention.
Figure 4:
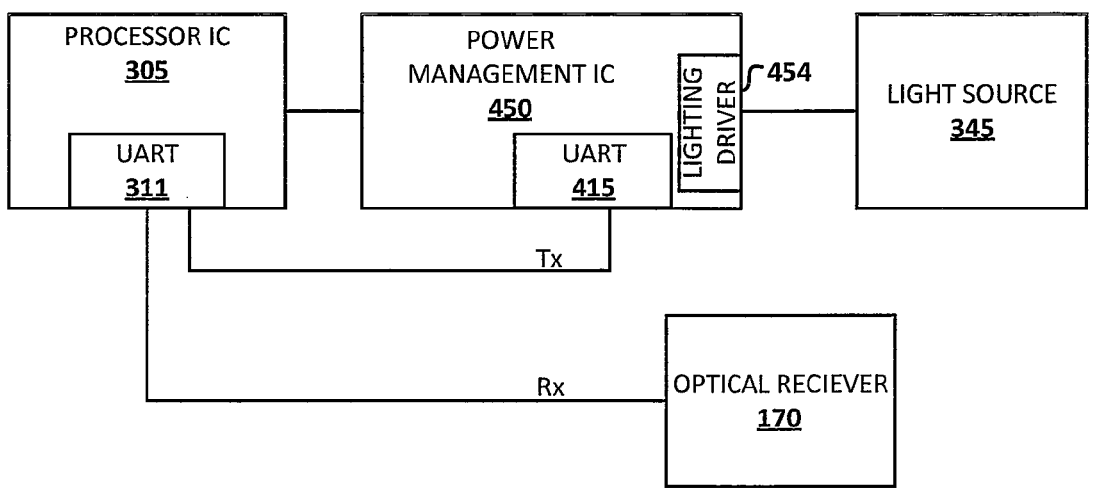

FIGS. 3 and 4 illustrate two different driver configurations of a light source, such as the example light sources (125, 135, 145, 245) of FIGS. 1 and 2, according to embodiments of the invention. As depicted, each driver configuration 300/400 comprises an interconnection between processor IC 305 and respective power management ICs 350/450. In both configurations, in a specific embodiment, processor IC 305 also includes universal asynchronous receiver/transmitter (UART) 311. In driver configuration 300 (FIG. 3), a separate lighting driver IC 354 is provided, which is coupled to power management IC 350 and to light source 345. Separate lighting driver 354 includes therein a second UART 313, which is operationally coupled to UART 311 via a data transmission (Tx) line. Separate lighting driver 354 controls the application of power to light source 345.

In driver configuration 400 (FIG. 4), lighting driver 454 is a component of (or embedded within) power management IC 450 and controls application of power to light source 345. Further, second UART 415 is also included within power management IC 450. In addition to the above components of driver configurations (300/400), each driver configuration 300/400 also comprises optical receiver 170, which is coupled to UART 311 via a receiving (Rx) signal line.

The lighting drivers 354 and 454 are designed to be able to switch the light source between an illumination state/mode and a communication state/mode. Switching is activated by the data processor triggering the power management IC 350/450 to activate the new communication state. In one embodiment, further enhancements to the driver configurations enable the switching and other power control features of the invention.

In one embodiment, a switch mechanism is provided within (or associated with) power management module 350/450. The switch mechanism maybe set in one of two states (e.g., on state and off state, or a 1 or 0 bit state when represented by a processor-settable bit). These two states may represent when the display/keypad 140/120 and light source 145/125 are being utilized in illumination mode and data transmission mode, respectively. The microprocessor triggers the switch mechanism by sending a signal to power management IC 350/450, which signal sets the switch mechanism and indicates to light source driver 354/454 a specific state (or operational mode) in which the light source 125/145 of the electronic device is to operate in. In another embodiment, the microprocessor triggers the switch mechanism by sending a signal to power management IC 350/450 and to a display driver IC (not depicted), which signal sets the switch mechanism and indicates the mode that display mechanism (e.g., display 140 and display light source 145) of the electronic device is to operating in. When in communication mode, the display itself assists with enabling the communication mode by displaying a monochrome screen, other graphical patterns, or displaying communication user interface or a communication status report.

FIGS. 5 and 6 illustrate alternative driver configurations with a separate switch mechanism and load. As shown, driver configurations 500/600 comprises processor IC 305 interconnected to respective power management IC 350/450. Processor ICs 305 include UART 311. Driver configurations 500/600 comprise a switch mechanism 539/639, which can be a field effect transistor (FET), which is coupled at its output to both light source 345 and an additional load 542. In driver configuration 500 (FIG. 5), switch 539 is coupled to separate lighting driver 354. In driver configuration 600 (FIG. 6), switch 639 is coupled to lighting driver 454, which is embedded within (or a component of) power management IC 450. In both configurations, switch 539/639 receives switching signals from processor IC 305.

As with FIG. 3, driver configuration 500 of FIG. 5 comprises a separate lighting driver 354. However, within driver configuration 500, separate lighting driver 354 is coupled between power management IC 350 and switch 539. Separate lighting driver 354 controls the application of power from power management IC 350 to display light source 345 (and load 542) via switch 539. In driver configuration 600 of FIG. 6, lighting driver 454 is provided within power management module 450 and (embedded) lighting driver 454 controls application of power to light source 345 (and load 542) via switch 639. As with driver configurations 300/400 of FIGS. 3 and 4, driver configurations 500/600 further comprise optical receiver 170, which is coupled to UART 311 within respective processor IC 305.

During operation, the power management circuit 150 (which may comprise power management IC 350/450, lighting driver 354/454, and in one embodiment switch 539/639) receives a data stream from the data processor (305), switches the light source 345 to a communication mode, and then modulates the light source to convert the data into optically modulated signals that are then emitted as optically-transmitted data from the electronic device (e.g., device 100/200 of FIGS. 1 and 2). Modulation of the light source may be supported by data modulator/demodulator 180. As one example, when modulating an LED light source with binary data, the data modulator/demodulator 180 signals the power management module 150 to modulate the individual LEDs, such that LED on=1 and LED off=0 or vice versa. In one embodiment, one or more of the light source(s) is modulated at a predetermined frequency (e.g., 212 KHz) to generate light signals representing optically-transmitted data that is emitted/transmitted from the electronic device (100/200).

During the A&C data transmission mode, the power management circuit 150 switches the lighting mode of the light source 345 from the illumination mode, which has first illuminating characteristics, to a data transmitting mode, which has second illuminating characteristics. The second illumination characteristics support modulation of the light source 345 and enables generation and transfer of the optically-transmitted data. In one embodiment, the second illumination characteristics includes, but is not limited to, one or more of: (a) increased power to specific individual components (e.g., LEDs) of the light source 345; (b) changing a color of light provided by the light source 345 to a pre-selected color that supports a desired transmission frequency; and (c) directing projected light at an angle that is a pre-determined number of degrees relative to a surface layer of the display device to enable maximum transmission of the optically-transmitted data in a pre-determined direction.

Figure 7:
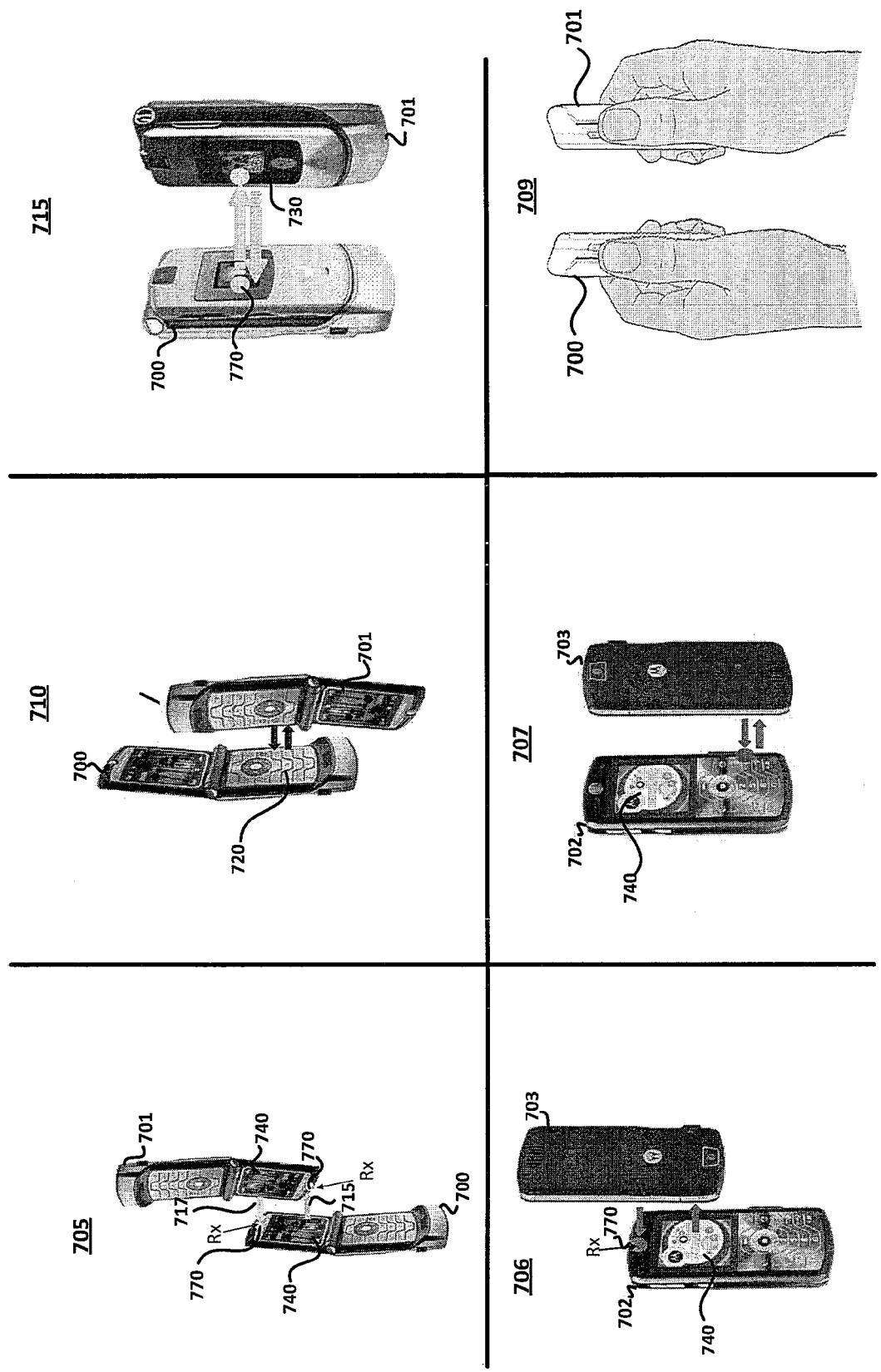
FIG. 7 is a schematic diagram illustrating different views of two-device pairings with a first optical link enabling transmission of optically-transmitted data using illumination light sources and optical receivers, respectively, for authentication and configuration of a secondary link for data transmission, according to embodiments of the invention.

The transmission and reception of modulated light enables one or more channels of A&C information transmission. That is, a single color (or wavelength) of light may be identified (or pre-specified) to support the optical modulating features of the invention or multiple colors (or wavelengths) may be utilized. In one embodiment, a color filter can be used to remove wavelength components with the longer rise and fall times and allowing the wavelength with the shortest rise and fall time to pass and to be emitted/transmitted for optical communication function. This application of a color filter substantially improves the overall bandwidth of optical data transmission. In another embodiment, different color LEDs (or OLEDs) are provided within the light source, and the power management circuit 150 is able to individually apply (and modulate) power to the different color component sources. In one embodiment, when the electronic display light source is used for A&C data transmission, the electronic display displays a monochrome pattern during the data transmission mode, and the monochrome pattern is spatially or temporally changed according to the spectrum of the illumination light source that is modulated. FIG. 7 illustrates an example of an exchange of information between two potable devices 700, 701 using a single wavelength of light transmission to create a single channel optical link 705 between the two devices 700, 701.

FIG. 7 provides a series of pictorial images of two portable electronic devices exchanging/communicating data with each other using respective light sources and optical receivers for data transmission, in accordance with embodiments of the invention. This first (primary) usage scenario enables device-to-device data transmission/communication on an optical link. In the illustrative embodiments, optical receiver 770 is provided on the exterior face of the portable electronic device 700 and 701. Different embodiments of the invention may be provided in which the optical receiver 770 is placed at different locations within the electronic device (700/701). The optical receiver 770 may consist of a single photodiode in a dedicated location. In another embodiment, multiple photodiodes are provided, distributed at various locations on the surface of the electronic device. In one implementation, the optical receiver 770 is integrated within the display assembly. With this implementation, the optical receiver 770 may be integrated on the display border or packaged with the backlight LEDs, for example. When packaged with the backlight LEDs, a special backlight guide may be provided. In yet another embodiment, the optical receiver 770 may be built in the display TFT plane of the electronic device.

As further shown by FIG. 7, a two-way optical data link (channels 715, 717) is completed using a line of sight between two electronic devices (depicted as cellular phones) with optical receivers 770. The position of the optical receiver 770 and the light source on the respective devices may dictate the orientation of the devices relative to each other when completing the A&C data communication. Each pairing of phone devices may be considered a different embodiment as the pairings each involve different configurations of the optical receiver 770 relative to light source. Additionally, the top three configurations (705, 710, and 715) illustrate use of three different light sources, namely light sources for display 740, keypad 720, and caller ID display 730.

In the first three configurations 705, 710, and 715, cellular phones 700 and 701 are flip phones, with a display 740 and keypad 720 provided when the phones are in the "open" position, and a caller ID display 730 in the front casing when the phone is in the "closed" position. In the bottom two configurations 706 and 707, cellular phones 702 and 703 are standard (non-flip) phones with the display and keypad visible on the front of the phone device.

In the first configuration 705, each cellular phone 700 and 701 transmits optically-transmitted data via display 740 and receives optically-transmitted data from the opposing display (740) via optical receiver 770. Similarly in the third configuration 715, each cellular phone 700 and 701 transmits optically-transmitted data via CLI display 730 and receives optically-transmitted data from the opposing CLI display (730) via optical receiver 770. However, in the second configuration 710, cellular phones 700 and 701 transmit the optically-transmitted data via keypad light source (not shown), and the optically-transmitted data emanates from keypad 720.

In several of the configurations, optical data transmission channels 715 and 717 are shown as directional arrows from the display 740 of respective cellular phones (700/701) to the opposite optical receiver 770. From the perspective of the primary cellular phone 700, optically-transmitted data is transmitted via transmission channel 715, while modulated light is received on receiving channel 717. Implementation of the invention thus enables peer-to-peer A&C information transfer without utilizing other short range communication protocols such as IRDA or Bluetooth.

In another embodiment, multiple wavelengths may be modulated independently to carry separate data streams of optically-transmitted data. The light source comprises at least two wavelengths in visible spectrum, with each wavelength associated with different colors in the spectrum having different transmission frequencies. Each of two or more wavelengths may be utilized as a separate transmission channel. In this embodiment, the power management module comprises a mechanism for separately assigning a different data stream of optically-transmitted data to two or more different color lights with different wavelengths and frequencies. An example of the implementation of multiple, concurrent transmission channels is illustrated by FIG. 8, which is now described.

Figure 8:
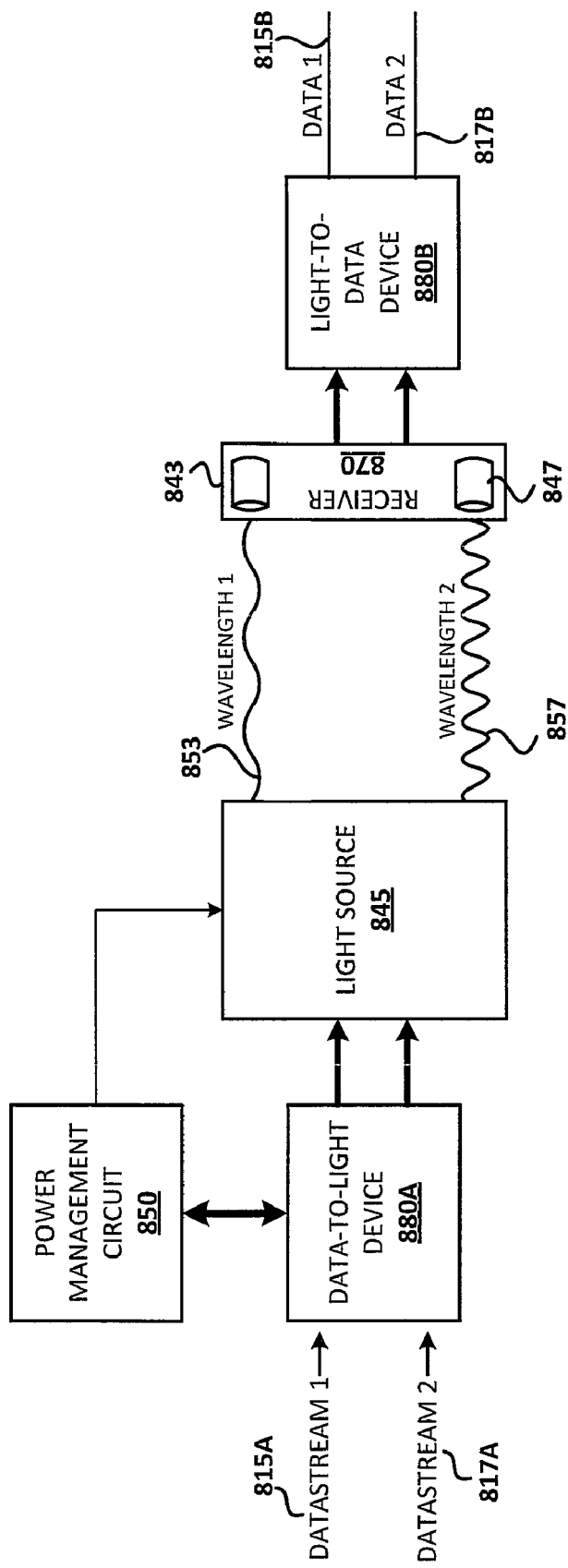
FIG. 8 illustrates a multiple wavelength implementation by which one or more optically-transmitted data streams are communicated from the light source of an electronic device to respective optical receivers, at different wavelengths/frequencies, according to one embodiment of the invention.

In FIG. 8, two data streams 815A, 817A are concurrently generated at data processor (not shown) and passed through data-to-light modulation device 880A (e.g., data modulator/demodulator 180 of FIGS. 1 and 2 and driver mechanisms described earlier). The modulation device 880A is coupled to power management circuit 850, which is in turn electrically coupled to light source 845. Light source 845 is modulated by power management circuit 850 to generate two channels of optically-transmitted data, namely channel 1 853 and channel 2 857, which respectively correspond to data stream 1 815A and data stream 2 817A. Each channel (853, 857) transmits optically-transmitted data via respective wavelengths (having different characteristics).

Both wavelengths are received at optical receiver 870, which includes sub-receivers 843 and 847, which each detect and receive specific ones of the two wavelengths of modulated light. Sub-receivers 843/847 forward the received optically-transmitted data to light-to-data modulation device 880B (e.g., a second data modulator/demodulator 180 and receiver devices), which demodulates the light to re-generate the data streams as received data streams 815B, 817B. With the present embodiments in which multiple primary colors (and/or wavelengths) are utilized to enable concurrent channels of data transmission, the overall bandwidth for data transmission is increased. Notably, the number of optical data channels may be increased up to a point at which bandwidth and/or performance begins to degrade.

Notably, with the above multiple concurrent channel transmission, the optical receiver 870 receives each of the wavelengths of optically-transmitted data via a separate sub-receiver. However, in one embodiment, a single optical receiver is provided and additional processing logic is then utilized to separate out the different data streams by identifying and de-convoluting the different data carried by two wavelengths via available de-convolution techniques. Alternatively, in one embodiment, the optical receiver 870 may be tuned to receive optically-transmitted data on only a specific channel, and the optical receiver 870 would thus filter out one (or both) of the optically-transmitted data received based on the wavelengths on which the data is transmitted. Thus, the optical receiver 870 filters out the other channels (e.g., by blocking all unsupported wavelengths) prior to forwarding the received optically-transmitted data to the modulation device 880B. By removing the other channels from the communication, the optical receiver 870 substantially improves the communication bandwidth for the supported channel(s), or enables a secure or private communication channel between two electronic devices.

The functionality of the invention, which is described in greater detail below, may be utilized to distinguish among the multiple wavelengths available as separate transmission channels for optical data transmission. In one embodiment, the second communication channel established may also be an optical channel, but one which has restricted access to only authenticated users of the portable device(s). Thus a first wavelength maybe utilized to transmit/communicate the A&C information required to configured and authenticate a second optical link that serves as the second communication link on which content data is transmitted between the devices. Transmission over multiple different optical links and/or secure transmission over specific ones of the multiple available optical links following configuration and authentication would enhance the security features when engaged in optical transmission of sensitive information.

In one embodiment, design of the optical receiver (170 of FIGS. 1 and 2) involves utilization of a fast response photo sensing device (e.g., Si PIN diode), which allows for a high data rate communication. An integrated circuit (IC) device may be selected, which integrates a photodiode and amplification circuits and which outputs digital logic levels. In one embodiment, the receiver IC is packaged with ambient light sensors, which determine ambient light levels and provide feedback to power management circuits to optimize optical data communication function and to reduce device power consumption. In order to increase the distance from which the data transmission may occur, one embodiment of the invention utilizes passive optical elements (e.g., a Fresnel lens) to enable light collection. The characteristics of the optical element, for example, the diameter or refractive index of the lens, determines its light collection ability and hence the distance from which optical data communication may occur.

B. Configuration and/or Authentication of Second Communication Link via Optical Link The features of the invention enables the utilization of short range optical communication link to establish/configure a second communication link and authenticate the participants in the communication over the second communication link before allowing the participants to exchange data over the second communication link. Also, the embodiments provide for relatively fast configuration, authentication and security of a data communication channel.

As described herein, the embodiments of the invention generally provide optical data exchange between two communication devices, which comprise an electronic display with external illumination source and an optical receiver, both of which are operatively connected to a data processing interface. The communication devices are further composed of a radio frequency (RF) wireless communication module which is used for data communication. The first communication device initiates connection and provides configuration, context and authentication information with the second device by sending data-modulated optical pulses from the display illumination source. The second communication device receives the connection, configuration and authentication info via an optical receiver, and may optionally request display illumination source of the second device.

Each electronic communication device comprises: an illumination light source and an optical receiver, wherein the illumination light source illuminates at least one component of the electronic device, and where the illumination light source and optical receiver are operatively connected to a data processor and are utilized to establish an optical communication link for communicating configuration requests and configuration responses with another electronic device via optical pulses encoded with the communication requests and responses; at least one data communication module, which is utilized to establish a second, different-type communication link on which data communication is completed.

The illustrative embodiments provide communication of optically-encoded data via an optical link from a first mobile device with short range optical data transmission capabilities to a second device configured with similar capabilities. The embodiments enable use of the short range (secure) optical channel to establish the security and protocol of the desired second communication link. The short range optical communication is provided via a modulated light source of the first electronic device, such as the display backlight, for example, and leads to configuration of and security authentication for the second communication link.

In addition to supporting activation of the data link configuration and authentication, the first device is also configured to be the receiving device and respond to A&C request with an acknowledgement and authentication information if required. The first device supports all other functions that may be required to complete the connection of the second data communication link.

According to the described embodiments, the second communication link is established as a data communication channel utilized for wireless (or wired) data transfer. When the data communication channel is wireless, the second communication channel may be implemented utilizing a wireless communication protocol, such as Bluetooth, WiFi or cellular (2G, 2.5G, 3G, 4G). The second communication link may be a direct link from one device to another, such as Bluetooth, ultra wideband (UWB), or millimeter wave (MMW) radio link, or the link may include one or multiple control elements such as an access point, a network router, a server, and a base station, etc, in the case of wireless fidelity (WiFi), WiMax, satellite, and cellular communication links, etc. In most implementations, the second communication link provides enhanced data communication characteristics, including one or more of higher bandwidth, longer transmission range for data communication than the optical communication link.

In one embodiment, the second communication link is an RF wireless communication link, configured according to the A&C information received from the first device via the optical pulses. The first device and second device then commence further data communication with each other via the established RF communication link.

While primarily illustrated and described as a single second communication link, the invention may be implemented in an embodiment where there are multiple secondary communication links. For example, both a Bluetooth and a WiFi communication link may be configured and provided using a single A&C transmission process over the optical link. The multiple second data communication links may or may not operate simultaneously.

Several different embodiments are provided in which the second communication link is configured in different ways and between different devices. In each embodiment, the optical link is utilized to transmit a different type of configuration and authentication information, based on the type of second communication link or the devices between which the second link is being established.

In a first embodiment, a one way configuration and authentication is provided to a second device. The first device transmits the relevant configuration and authentication to enable the second device to set up a second communication link between the second device and one of (a) the first device or (b) a third device. This embodiment enables the configuration by the second device of the second communication link utilizing the parameters and/or protocols and security information (provided within the A&C information from the first device) required for the second device to configure and access the second communication link. In one example of this first embodiment, the second device configures a second communication link with a content provider, which provides particular content on a second communication link when the second link is established by the second device and/or the correct security codes (or key), received within the A&C information from the first device, are provided to the content server by the second device.

As another example of this embodiment, which involves a third device, a first user may purchase the rights to consume certain content from a content provider, which has multiple "seats". The first user may then pass the "seat" (i.e., information required to access the content at the content provider) to a second device via the optical link. The second device then configures the second link with the content provider, which forwards the content to the second device when the second device provides the required configuration and/or authentication data.

In another example, a user of a cell phone may purchase minutes for use on his phone (first device). The user may then transfer a portion (token) of those purchase minutes to another cell phone (second device) via the optical link. The second device presents the token information to the carrier and the carrier allocates the minutes to the second user's account. The second user may then utilize these minutes via the cellular provider.

In a second embodiment, a two-way configuration and authentication process is enabled between the two devices. The first device transmits on the optical link the A&C information, which may include a prompt/request for return of information. The second device then provides a response on the optical link, which response includes one or more of: additional configuration information from the second device's end of the communication link, an acknowledgement that the configuration information is received and accepted, a security password to establish the second communication link, and a preferred type (parameters) of second communication link supported by the second device. The first device may then establish the second communication link with one of (a) the second device or (b) a third device following receipt of the response/acknowledgement on the optical link.

Figure 9:
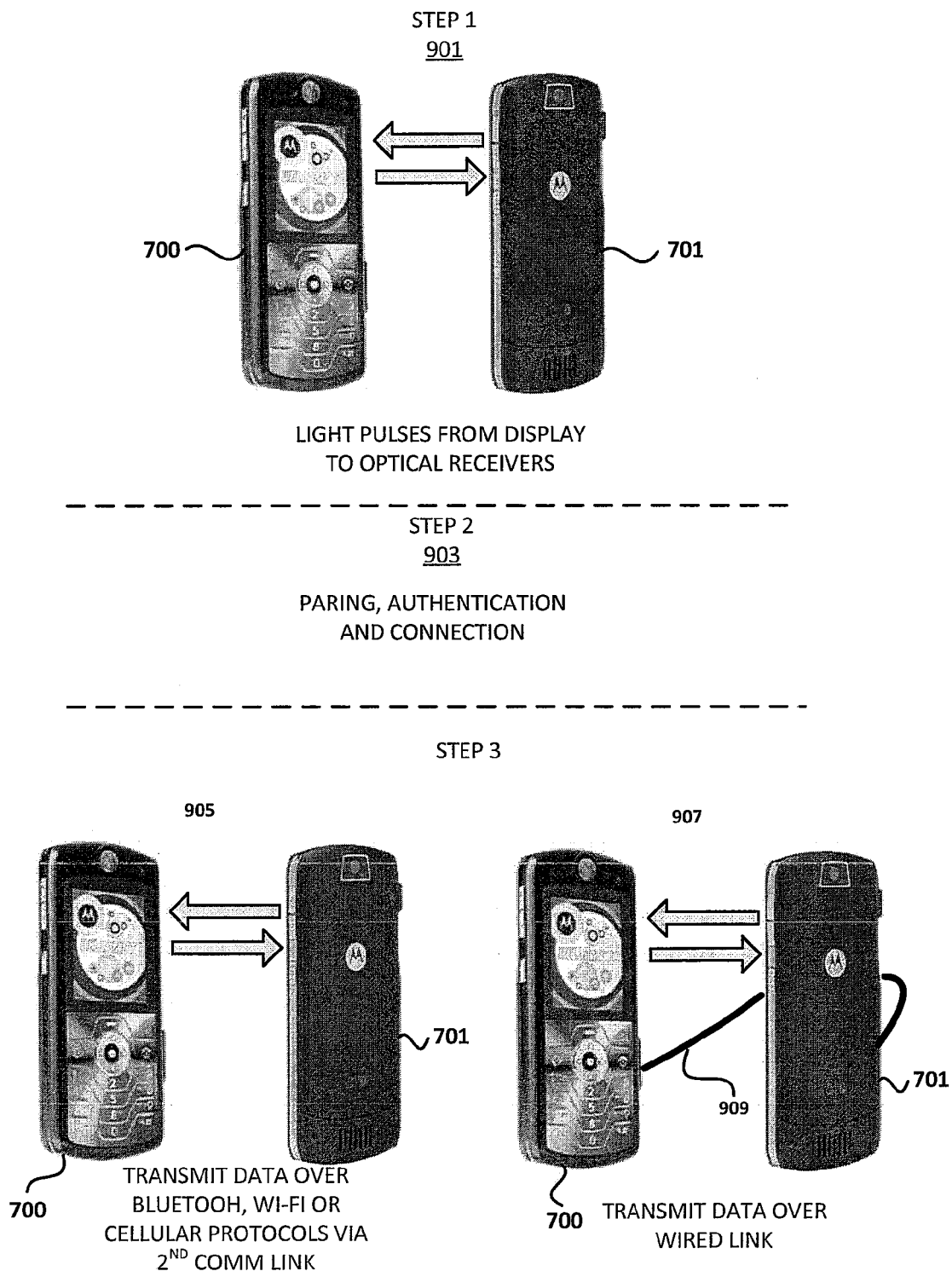
FIG. 9 is a sequence diagram illustrating the authentication and configuration of a second data communication link via an optical link between two portable electronic devices, in accordance with one embodiment of the invention.

FIG. 9 illustrates the three main steps with the A&C processes involved with two devices communication between each other, according to one embodiment of the invention. In the first step 901, two mobile devices 700, 701 exchange A&C requests and data via light pulses from respective displays to optical receivers. In the second step 903, logic components of the devices complete paring of the devices, including authentication and connection configuration of the second communication link, such as Bluetooth, WiFi (Wireless Fidelity) or other cellular protocols supported by both devices. In the first implementation 905 of the third step, the two devices 700, 701 initiate communication of content data using one of the available second communication links. Finally, in the second implementation 907 of the third step, the two devices 700, 701 communicate content data via a wired connection between the devices.

The utilization of the functionality of the first embodiment and the second embodiment to enable communication with a third device (such as a content server) may require the exchange of authentication information with the content server, rather than with the second or first device. Also, since the second communication link of importance is with the third device, the exchange of configuration and authentication information may be solely for communication with the third device.

Figure 10A:
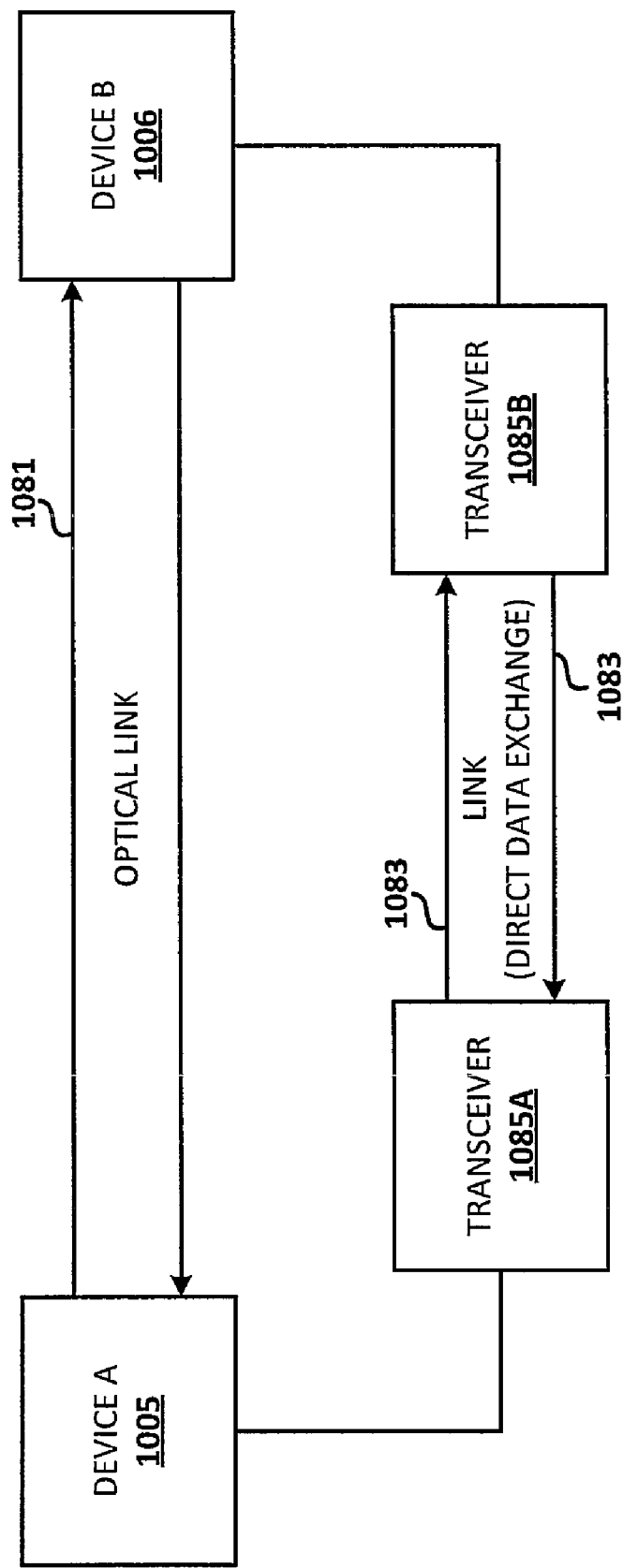
FIGS. 10A and 10B provide two system views of devices completing Authentication and Configuration (A&C) communication exchange over a first optical link and data exchange via a second data communication link, in accordance with embodiments of the invention.
Figure 10B:
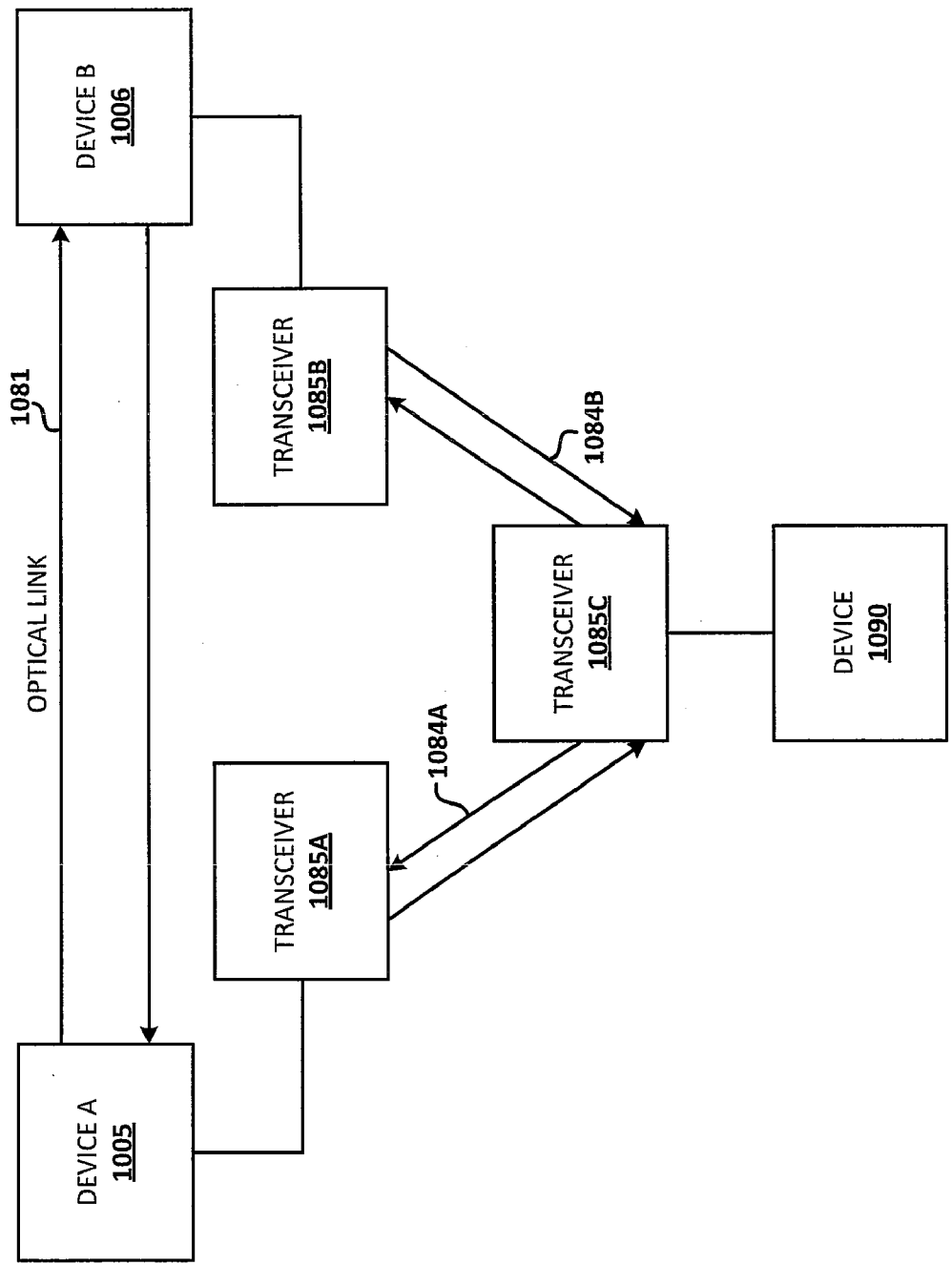

Turning now to FIGS. 10A and 10B, which provide two block schematics illustrating dual communication links between multiple communication devices, according to two alternate embodiments of the invention. Specifically, FIGS. 10A and 10B illustrates (a) A&C information exchange between two devices (device A 1005 and device B 1006) using the illumination light sources and optical receivers to transmit and receive optically-transmitted data (generated by modulating the light source). FIG. 10A also illustrates the subsequent exchange of content data on a second data communication link 1083, which is established between respective transceivers 1085A and 1085B of device A 1005 and device B 1006s. FIG. 10B, in contrast, illustrates the subsequent exchange of content data with/from a content provider or server, device C 1090, on a different second data communication link 1084. The second communication link (1084A/1084B) is assumed to provide/require different communication characteristics (including different configuration and authentication parameters and protocol).

In both FIGS. 10A and 10B, device A 1005 provides the A&C information along optical link by modulating the light source during A&C request/data transmission. The modulated light emanates/travels from light source of device A, and the light is received by the optical receiver of Device B 1006 during a receiving stage. The received modulated light is "demodulated" (i.e., the A&C information is extracted) by device B 1006, and the demodulated (extracted) data is forwarded to the device B's processor, as "second communication link A&C information".

According to embodiments, the A&C information may comprise one or more of the following content, among others: (a) a request to initiate a data connection on the second communication link; (b) configuration information (operating protocols, parameters, etc.) required for setting up the second communication link; (c) a request for a security PIN or Key to access the second communication link; (d) authentication and encryption information for the second communication link; and (e) context information.

If a two way authentication and configuration process is required, transmission of an A&C response (acknowledgement signal) from Device B 1006 along optical link 1081 to Device A 1005 occurs via a similar process. That is, the modulated light is transmitted from the light source of device B 1006 and received by the optical receiver of device A 1005. The light source may be the illumination light source for display, keypad or may be the emissive display or funlight of device A 1005 and/or device B 1006. Both paths of optical data communication form the bi-directional optical link 1081 between the two devices 1005, 1006, on which the A&C information and A&C response are transmitted.

Device A's data processor is also operatively connected to a different-type data transceiver 1085A, which enables device A 1005 to exchange (transmit and receive) other types of data (content data) via a second data communication link 1083. In FIG. 10A, second data communication link 1083 allows device A 1005 to exchange data directly with device B 1006 on the second data communication link. The data exchange is supported by transceivers 1085A and 1085B of device A 1005 and device B 1006, respectively.

With the alternate configuration of FIG. 10B, a next second data communication link 1084A, 1084B is provided for data exchange between device A 1005 and/or device B 1005 with device C 1090. Device C 1090 may be a server or content provider device. Both device A 1005 and device B 1006 include an associated data transceiver 1085A and 1085B, respectively, which enables either device to communicate over the second data communication link 1084A, 1084B with Device C 1090, which also has an associated data transceiver 1085C.

As further shown, device B 1006 may also be communicatively connected to device C 1090 via a different second communication link 1084B from the second communication link 1084A on which device A 1005 connects to device C 1090. This configuration of device B 1006 applies to the single-direction authentication and configuration process, where device B 1006 receives the token or other authentication information from device A 1005 in order to communicatively connect to device C 1090 on a second communication link 1084B, as described herein.

The presence of the second communication link 1084A/1084B to a third party device, Device C 1090, accounts for embodiments in which the configuration and authentication process is performed between two devices connected via the optical link to enable a later exchange of content data via another pairing of devices on a second communication link, including only one of the original devices. In a first embodiment, device A 1005 completes the authentication and configuration process with device B 1006 on the optical link. The A&C process involves providing to device B 1006, via the optical communication link, information required by device B 1006 to enable communication of content data on a second data communication link 1084A with/from a content or service provider (e.g., Device C 1090). In one embodiment, the content data is then communicated in encoded format to device B 1006, and the encoded data can be decoded using encryption information transmitted to device B 1006 from device A 1005 as a part of the A&C information on the optical communication link 1081.

In another embodiment, the A&C information received from or provided to the second device on the optical communication link includes token information required to consume data that is transmitted on a second data communication link from a content (or service) provider. The token information transmitted on the optical communication link is required to consume the content data received on the second communication channel. Either the device A 1005 or device B 1006 may thus consume the content data received from the content provider (device C 1090).

Applying the illustration to the above described example of a user purchasing a seat for consumption of content, embodiments, a user of device A 1005 purchases rights to consume certain content of content provider, device C 1090, which has multiple "seats". The device A user passes/transfers the "seat" to device B user on a first trusted link. Thus, the device A user transfers, via the optical link 1081, the security data (encryption code) required to access the content from the content provider (1090). The content provider (1090) is then triggered to send the content (perhaps encoded) to the device B user when the device B user communicates the encryption code to the content provider on a second communication link 1084B. The content provider (1090) may also transmit encoded data to device B 1006, which utilizes encryption/decryption information provided during the authentication and configuration exchange with Device A 1005 to decode the received data.

One extension of the functionality associated with the above described embodiment provides for establishing trusted links among more than two electronic devices by passing the purchased seats to multiple electronic devices so that content data can be consumed by multiple users, perhaps in a close social group, in a distributed interactive fashion.

An example of the process by which the above features of the described embodiments are implemented is illustrated by the flow diagram of FIG. 11. The process begins at initiator block 1101, and proceeds to block 1103 at which a request is received (perhaps via user entry) at a first device (e.g., device A) to establish a second data communication link on which to transfer content data from device A to a second device (e.g., device B). In an alternate implementation, the initial request received is to set up the optical link that is then utilized to transfer information required to configure and authenticate the second communication link.

The second communication link may be selected from a list of available types of data communication link options for which device A has the requisite hardware/software components required. A determination is made at block 1105 whether authentication and configuration of the second communication link is desired before data communication can be enabled on the second communication link. If no such authentication or configuration is required, then the first device establishes the second communication link with device B and performs the data transfer/communication over the second communication link, as shown at block 1121. Then the process ends at block 1119.

If authentication and configuration is desired prior to enabling the second communication link, and assuming the second device is designed/configured to support optical communication (as determined at block 1107), an optical link is established with the second device and authentication and configuration (A&C) information is transmitted to the second device, as shown at block 1109.

Following, at block 1111, a determination is made by the first device, whether an acknowledgement of/response to the transmitted A&C information is received. The first device then determines at block 1113 if authentication information is confirmed, e.g., i.e., whether the response included the PIN or Key required to complete authentication and connection of the second communication link. If the acknowledgement is received and the authentication is confirmed, the first device (operating in concert with the second device) establishes, configures and bonds the second communication link between the two devices, as shown at block 1115.

The users of the devices may be provided with specific authentication/security codes by which the user is able to establish a secure second communication link with another device. The user(s) of one or both of the first and the second device may be prompted to enter the security data, which is then transmitted via optical transmission to the other device within the A&C information and acknowledgement/response, respectively. In another embodiment, the user's device may include the specific authentication parameters encoded therein, and the device automatically responds to an A&C request by retrieving the stored parameters, optically encoding the parameters by modulating the light source and transmitting the optically encoded parameters as a part of the A&C request (for first device) or response thereto (from second device). When the authentication is complete and the second communication link has been configured and established, data transfer is enabled/activated via the second communication link, as shown at block 1117.

If either the acknowledgement or the authentication parameters is not received within a pre-set timeout period, as monitored by decision block 1125, the data transfer via the second communication link is not enabled, as shown at block 1123, and the process ends at block 1119, perhaps after sending a request for a secondary method of authentication or signaling a failure to establish or authenticate the primary data link.

In the flow chart described above, one or more of the methods may be embodied as computer readable code, such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

With the above two way configuration and authentication process, the first device comprises: (1) first logic for (a) initiating an authentication and configuration connection via the optical communication link and (b) transmitting a configuration request and receiving a configuration response via the optical communication link to establish and configure a data communication connection over the second data communication link; and (2) second logic for responding to a receipt of an acknowledgement to the configuration request. In one implementation, the acknowledgement includes an approval of data communication via the second data communication link, by enabling content data to be communicated over the second data communication link.

The configuration request includes information comprising one or more of: (a) configuration information, (b) context information, and (c) authentication/security information for establishing the second communication link. The authentication and configuration connection is established with a second electronic device having a second optical receiver. Also, the first logic comprises logic for transmitting the configuration request from the first device by sending optical pulses from the illumination light source of the first device, where the configuration request is encoded within the optical transmission, which is transmitted over the optical communication link. The first logic further comprises logic for: initiating a timer when the configuration request is transmitted over the optical communication link; monitoring the timer for expiration of a pre-set timeout period; and in response to the timer reaching the pre-set timeout period before receipt of the acknowledgement: (a) preventing communication of data via the second data communication link; and (b) signaling a failure to complete configuration of the second data communication link.

In alternative embodiments, the availability/use of the second communication link may be instantaneous in some use cases (with no timeout period), such as in the case of Bluetooth, while in other use cases, the use of the data communication link occurs after an unknown period of time. This latter case may occur, for example, when using a cellular network to send encrypted data, which can be sent at a later time, at a remote location. In this latter implementation, no timer function is associated with establishing the second data communication link.

The first logic may further comprise logic for generating the configuration request to include at least one of: (a) security data for enabling secure data transmission over the second data communication link, where the acknowledgement signals one or more of: (1) authorization to establish the second data communication link and complete data communication on the second data communication link; and (2) set up of a secure channel on the second data communication link for completing secure data communication; and (b) a query for return of corresponding security data for dual authentication from the electronic device. When the query method is utilized/implemented, the acknowledgment includes second device security authentication code. Then, data communication on the second data communication link is enabled following a receipt and confirmation of the corresponding security data.

In one embodiment, when authentication data is received, the utility compares the authentication data against pre-established authentication parameters required for establishing the second data communication link. The authentication data may be one or more of (a) a password (b) a biometric sensor input and (c) an electronic token. Data transmission between the first device and the second device on the second data communication link is only permitted following authentication of the device and/or the link. In one embodiment, authentication may entail authentication of at least the second device or authentication of both devices.

In yet another embodiment, the first logic comprises logic for providing data encryption information within the configuration request transmitted over the optical communication link, and the second logic further comprises logic for encoding data to be communicated over the second data communication link with the encryption information communicated via the optical communication link. The second logic further includes logic for providing a data transfer interface on the second data communication link, where the data transfer interface supports processing of encoded data by the data processor. The devices operate as two sides of data encryption/decryption, where an encryption key is passed via the optical link and the key is required to decipher (decode) the data that is transmitted on the second communication link.

According to one embodiment, the first logic further comprises logic for receiving, via the optical communication link, information required to enable communication of data on a second data communication link from a content provider. The content data is then communicated, encoded with encryption information corresponding to decryption information received on the optical communication link.

C. Second Device Utilization for Data Transfer Over Second Communication Link

In the various functional application scenarios (i.e., the embodiments illustrated by the various figures), an optical data communication system is established by a first portable electronic device, designed with functionality for optical data transmission, as described herein, and a second device. The first electronic device includes: (1) a data processor for generating data for communicating with an external device; and (2) an illumination light source for illuminating a component of the first electronic device and for selectively transmitting data via optical pulses. Additionally, the first device includes data transmission logic for: (a) providing a data transfer interface that supports processing of selected data by the processor; (b) switching the illumination light source from an illumination mode to a data communication mode when optical data transmission is being implemented; and (c) transmitting data from the electronic device by encoding the data in optical pulses generated with the illumination light source.

To enable bidirectional optical communication/data exchange, the first electronic device also comprises an optical receiver which is operable as a receiver (for optically-transmitted data) within an optical communication data link. The optical receiver has associated logic for responding to the receipt of optically transmitted data by: (a) extracting the data from the light input; and (b) enabling processing of the data by the processor. The optical receiver may be a built-in optical receiver and/or a separate optical receiver that is communicatively tethered to the first device.

The communication between the first and second devices is completed via a bi-directional duplex communication link, created with a second optical receiver and an optical data transmission mechanism of the second electronic device. Within this link, at least the first electronic device is equipped with a dual function optical transmitter (i.e., a light source that is utilized for both illumination and data communication). The second device may also be configured with a dual function transmitter or may alternatively have a dedicated transmitter. For each described embodiment, the first device is placed/held within the optical range of the second device's optical receiver (i.e., the range at which the second device's receiver can accurately receive the optical pulses containing data from the first device).

The first device may be one of (a) a cell phone, (b) a PDA, (c) a personal multimedia player (PMP), (d) a MP3 player, or some other portable electronic device. Also, the second device may include a built-in optical receiver and/or a separate optical receiver that is communicatively tethered to the second device. The first device comprises logic for enabling sharing of portions of data contained within the first device and/or the second device by contemporaneously transmitting data encoded within optical pulses between the first electronic device and the receiver of the second device and vice versa.

Figure 12:
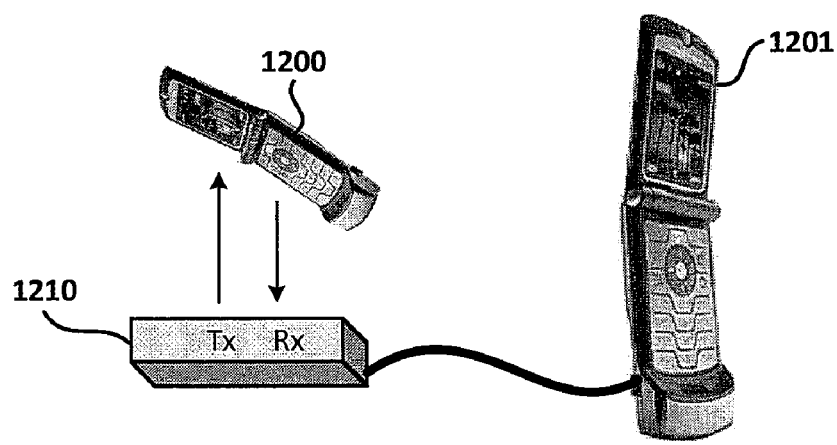
FIGS. 12-14 illustrate alternate methods of providing optical data communication between two devices, including use of a separate optical receiver/transceiver to communicate with a secondary electronic device to which the transceiver is tethered, in accordance with embodiments of the invention.
Figure 13:
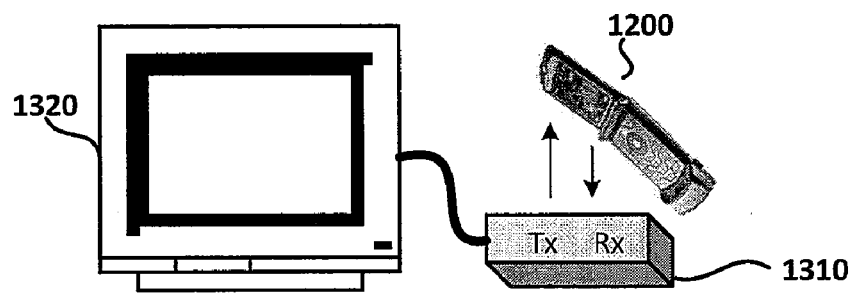
Figure 14:
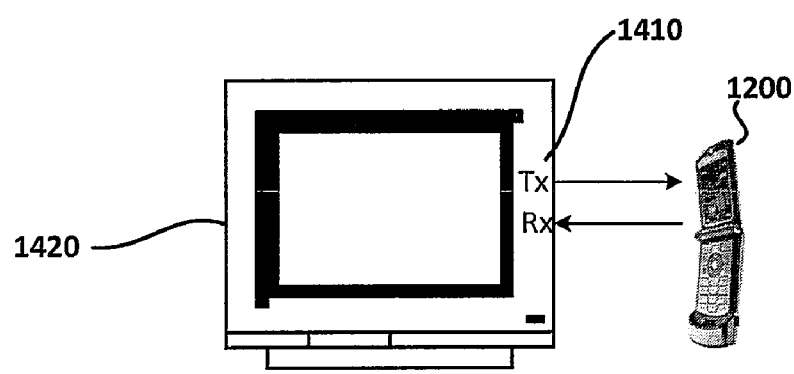

With the various embodiments described above, the first and second electronic devices are similar devices and the optical link is a simple bidirectional communication link between similar devices. FIGS. 12-14 illustrate several example embodiments in which the optical link is created between different types of devices, namely a first portable electronic device (e.g. a cellular phone) and a second, different, electronic device/mechanism. With these examples, the second communication link may or may not be between the two devices that create the optical link. With the latter two embodiments, (FIGS. 13-14), the second electronic device/mechanism performs a primary function following receipt of A&C information within modulated optical pulses generated by the illumination light source of the first electronic device. In each of the latter embodiment, the second device (e.g., computer system 1320, 1420) may perform date exchange via a background network (not shown) or send secure data to a removable storage device only when after receipt of authentication data via the optical link. In a more general embodiment, the second device is designed to perform a particular function in response to receipt of certain A&C information via modulated optical pulses.

FIGS. 12 and 13 illustrate embodiments in which a separate optical transceiver device 1210/1310 is provided and utilized to complete the communication link with a second device 1201/1320. As shown by FIGS. 12 and 13, an optical transceiver device 1210, 1310 couples to the second electronic device 1201, 1320 to allow optical data communication between first electronic device 1200 and second electronic device 1201, 1320. Specifically, in FIGS. 12 and 13, the optical transceiver device 1210, 1310 is tethered via a communications link to the second devices, mobile phone 1201 and computer device 1320, respectively. The second electronic device 1201, 1320 may not be equipped with the capabilities to modulate its light source(s).

Where the second electronic device is a cellular phone, the optical transceiver device 1210 may be connected via the data communication port (and/or power port) of the other cellular phone (1201). The optical transceiver device 1310 may be coupled to computer device 1320 via a serial data connection (e.g., USB—universal serial bus). The optical transceiver device 1210, 1310 includes an optical receiver and, in one embodiment, an LED or other light source, which is utilized as the optical transmitter. In another embodiment, the optical transceiver device 1210, 1310 includes electronic circuits and ICs that performs signal amplification, filtration, and data interface functions. The illumination light source emanating the encoded data from the first electronic device 1200 is placed in proximity to the optical receiver of the optical transceiver device 1210, 1310. The first electronic device 1200 transmits and receives data to and from the second device (1201, 1320) via the optical transceiver device 1210, 1310.

As shown by FIG. 14, computer device (or monitor) 1420 comprises dedicated optical transmitter/receiver 1410 embedded within the external casing of device monitor 1420. In one embodiment, computer monitor 1420 includes a specifically identified optical transceiver area within the external computer casing. With this configuration of second device (1420), first electronic device 1200 and computer device 1420 may establishes a direct bi-directional optical link for A&C information exchange.

In one embodiment, transmitting the A&C information from the first electronic device activates one or more preset functions, which functions may include first initiating/establishing the communication link. Also in one embodiment, when an error in transmission is detected in the received data, the receiving device (e.g., the first electronic device) automatically requests a retransmission of at least a portion of the data that was transmitted (i.e., the portion containing the error) via the communication link. Thus, according to this embodiment, faulty communication is corrected by re-transmission of the data. Also, in one embodiment, the first electronic device may include logic that issues a confirmation message to indicate the completion of data transmission.

In other embodiments, the first electronic device further comprises logic for: (a) transmitting, on the optical communication link, a request for authentication data from a second device; (b) comparing the authentication data received in response against a pre-established authentication parameter that is required to establish the optical communication link. The authentication data may be one or more of (a) a password, (b) a biometric sensor input, and (c) an electronic token. Entry of an electronic token may be required for certain media files that may require Digital Rights Management (DRM). In these cases, a pre-arranged token is then established to consume the data. Following the authentication, the first device enables transmission of content data (i.e., data that is not authentication data) from the first device to the second device. Accordingly, the content data is only transmitted on the second data link after authentication of the second device.

In a related embodiment, the first electronic device comprises logic for requesting entry of an authentication data in the first device prior to enabling the first device to transmit content data to a second device on the second data link. The entered authentication data is then compared against a pre-established authentication parameter that is required for the first device to transmit content data to the second device. Thus, transmission of content data from the first device to the second device is only enabled after correct authentication at the first electronic device.

In another related embodiment, the first electronic device comprises logic for providing an authentication data to the second electronic device upon receipt of a request from the second electronic device prior to enabling the first device to transmit data to a second device. The entered authentication data is then compared against a pre-established authentication parameter that is required for the first device to transmit data to the second device. Thus, transmission of data from the first device to the second device is only enabled after correct authentication of the first electronic device by the second electronic device.

In one embodiment, when a request for activation of a duplex communication link is received at the first device, the logic of the first device responds by: (a) generating a response data from a processor of the first device; (b) initiating a communication interface on the processor for data transmission (which enables the interface to initiate and set transmission parameters, such as speed); (c) switching the light source of the first device from an illumination mode to a communication mode; (d) dynamically activating a first power level optimized for completing the modulating of the light source; and (e) modulating the light source to produce modulated optical signals indicative of the response data generated from the processor.

The described embodiments of the present invention provide a method, system, and communication device that enables secure data transmission via modulation of the light source of an electronic device, such as electronic device 100/200 of FIGS. 1 and 2. The described embodiments capitalize on the availability within many existing portable electronic devices of components with a modifiable light source. In one embodiment, the light source may comprise a large number of individually controllable sub-sources, whose characteristics (e.g., intensity, length and time of light output) may be modulated by a power management circuit.

Generally, the embodiments of the invention provide a method to quickly and securely connect two wireless communication devices on a secure second communication link for communicating content data. The fast paring, configuring and establishing secure wireless communication link between two handsets or other mobile devices enables better utilization of data functions on mobile devices.

Implementation of the invention enables short distance, line of sight, wireless data transfer to configure a second communication link for data communication. One embodiment utilizes the display light source to provide an optical data link to transfer secure information between two electronic devices or between an electronic device and a dedicated reader (i.e., a device comprising a built-in optical receiver, where the device is used specifically to read optically-transmitted data generated in the manner described herein). The optical data link utilizes installed light sources and photo detectors on the electronic devices as emitters and receivers. In one embodiment, LEDs used as the display backlight are modulated at a predetermined frequency, e.g., 212 KHz, to generate the modulated light emission that comprises the optically-transmitted data.

With each application of the features of the invention, since power needs to be provided to send or receive data in an optical link, an active action is needed to start data transfer. Thus, the communication between the two communication devices (or the communication device and an optical reader as shown in FIGS. 12 and 13) is an intentional (user-directed) communication. Unwanted data transfer is minimized and security is improved compared to existing near field communication technologies. Also, with LED light sources becoming ubiquitous in the backlights of electronic devices, having these LED light sources perform a secondary data transmission function reduces the power and space demand that would be required to add additional communication components.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution.

While the invention has been particularly shown and described with reference to a preferred embodiment, it will be understood by those skilled in the art that various changes in form and detail may be made therein without departing from the spirit and scope of the invention.

What is claimed is:

1. An electronic communication device comprising:
    an illumination light source and an optical receiver, wherein the illumination light source illuminates at least one component of the electronic device, and wherein the illumination light source and the optical receiver are operatively connected to a data processor and are utilized to establish an optical communication link for communicating configuration requests and configuration responses with another electronic device via optical pulses encoded with the configuration requests and configuration responses;
    wherein the optical communication link is a first data communication link;
    at least one data communication module, which is utilized to establish a different-type, second data communication link on which data communication is completed;
    first logic, coupled to the data processor, for (a) initiating an authentication and configuration connection via the optical communication link and (b) transmitting a configuration request utilizing the illumination light source and (c) receiving, via the optical receiver, a configuration response transmitted over the optical communication link, which configuration response includes information required to establish and configure a data communication channel over the second data communication link; and
    second logic, coupled to the first logic and the at least one data communication module, for responding to a receipt of the configuration response to said configuration request by enabling data to be communicated over the second data communication link.

2. The device of claim 1, wherein:
    said configuration request includes one or more of (a) configuration information, (b) context information, (c) authentication/security information for establishing a second data communication link, and (d) encryption/decryption information for data to be transferred on the second data communication link, wherein the authentication and configuration for connection with a second electronic device having a second optical receiver is established; and
    said first logic further comprises logic for transmitting the configuration request from the device by sending optical pulses from the illumination light source of the device, wherein said configuration request is encoded within the optical transmission and transmitted over the optical communication link.

3. The device of claim 1, said first logic further comprising logic for:
    initiating a timer when the configuration request is transmitted over the optical communication link;
    monitoring said timer for expiration of a pre-set timeout period; and
    in response to said timer reaching said pre-set timeout period before receipt of an acknowledgement:
        preventing communication of data via the second data communication link; and
        signaling a failure to complete configuration of the second data communication link.

4. The device of claim 1, said first logic further comprising logic for generating said configuration request with at least one of:
    (a) security data for enabling secure data transmission over the second data communication link, wherein the configuration response indicates one or more of: (1) authorization to establish said second data communication link and complete data communication on the second data communication link; and (2) set up of a secure channel on the second data communication link for completing secure data communication; and
    (b) a query for return of corresponding security data from a second device receiving the configuration request, wherein the configuration response includes second device security authentication and wherein data communication on the second data communication link is enabled following a receipt and confirmation of corresponding security data.

5. The device of claim 1, said first logic further comprising logic for:
    generating said configuration request with communication protocols for supporting data communication over the second data communication link;
    wherein said configuration response includes confirmation of a configuration set up of a second device to support data communication over the second data communication link via the communication protocols.

6. The device of claim 1, wherein:
    said first logic comprises logic for providing, within the configuration request transmitted over the optical communication link, one or more of (a) data encryption and decryption information for data to be transmitted over the second communication link and (b) token information that provides access to a trusted link to consume data from a third device, said trusted link being the second communication link, wherein said token information may be passed to multiple second electronic devices to enable each of the multiple second electronic devices to have access to consume the data from the third device; and
    said second logic further comprises logic for utilizing data encryption and decryption information that is transmitted over the optical communication link to encode data that is communicated over the second data communication link.

7. The device of claim 1, said first logic further comprising one or more of:
    logic for receiving, from a second electronic device via the optical communication link, information required to enable communication of data on a second data communication link with a content provider, wherein said data is communicated encoded with encryption information transmitted on the optical communication link; and logic for receiving from a second electronic device via the optical communication link, token information required to consume data that is transmitted on the second data communication link by a content provider, wherein said data may only be consumed with the token information transmitted on the optical communication link.

8. The device of claim 1, wherein said second communication link provides enhanced data communication characteristics, including one or more of higher bandwidth, longer transmission range, and better security for data communication than the optical communication link.

9. The device of claim 1, wherein:
the optical receiver is a first optical receiver;
said first logic further comprising logic for:
  receiving a second request for connection, configuration and authentication information via the first optical receiver; and
  responding to a receipt of said request for second connection, configuration and authentication information by:
    generating an acknowledgment including therein requested connection, configuration and authentication information; and
    forwarding the requested information via the optical communication link to complete configuration of a second channel for data transmission over a second data communication link being established; and
said second logic further comprising logic for configuring the second data communication link according to the received second connection, configuration and authentication information, wherein said device is configured to support further data communication with a second device via the second data communication link using the second connection, configuration and authentication information.

10. The device of claim 9, said first logic further comprising logic for transmitting via the optical communication link a next request for additional information prior to enabling said data communication over the second data communication link, wherein said next request is transmitted using encoded optical pulses from the illumination light source.

11. The device of claim 1, wherein the communication module is a radio frequency (RF) wireless communication module and the second communication link is an RF communication link.

12. The device of claim 1, wherein the second communication link is one of a Bluetooth, wireless fidelity (WiFi), UWB, MMW, WiMax, satellite, and cellular communication link.

13. The device of claim 1, further comprising:
a power management circuit operatively connected to the data processor and to the illumination light source, wherein the power management circuit selectively drives the light source with power levels optimized for illumination and with power level modulation indicative of the configuration request and configuration response generated from the data processor; and
said first logic having logic for:
  generating the configuration request and the configuration response via the data processor;
  activating a communication interface on the data processor for transmission of one of the configuration request and an acknowledgment;
  switching the illumination light source from an illumination mode to a communication mode;
  modulating the illumination light source to produce modulated optical signals indicative of the one of the configuration request or the acknowledgment generated from the data processor; and
  transmitting, via a first communication protocol, the one of the configuration request and the configuration response from the device by encoding the data in optical pulses emitted from said illumination light source; and
said second logic having logic for providing a data transfer interface on the second data communication link, wherein the data transfer interface supports processing of selected data by the data processor that is functionally connected to a second communication module for transmitting data via a second communication channel, established during configuration of the second data communication link.

14. The device of claim 12, wherein the first logic further comprises logic for:
receiving, via the optical receiver, an acknowledgement encoded via optical pulses, wherein the optical receiver is functionally connected to the data processor; and
extracting the configuration response from the optical pulses and enabling processing of the acknowledgement by the data processor.

15. The device of claim 12, wherein:
the device is a first device having the illumination light source and the optical receiver and wherein the optical communication link is a bidirectional duplex communication link created with a second optical receiver and an optical data transmission mechanism of a second device;
the configuration request is transmitted via the optical pulses from the first device and is received by the second optical receiver of the second device;
the configuration response is transmitted from the second device and is received by the first optical receiver of the first device; and
said first logic comprises logic for:
  transmitting from the first device via the optical pulses over the communication link, a request for authentication data from the second device to authenticate the second device;
  comparing authentication data received in response to said request against a pre-established authentication parameter required for establishing the second data communication link, wherein the authentication data is one or more of (a) a password (b) a biometric sensor input and (c) an electronic token; and
  enabling transmission of data between the first device to the second device on the second data communication link following authentication, wherein data is only transmitted on the second data communication link after authentication of at least the second device.

16. The device of claim 1, wherein:
said device is an electronic device from among is a mobile phone, PDA, MP3, digital camera or camcorder; mobile computer; and
wherein the illumination light source illuminates at least one of: (a) an electronic display and (b) a keypad.

17. A data communication system comprising:
a first electronic device having:
  a data processor for generating data for communication with an external device;
  an illumination light source, coupled to the data processor, for illuminating a component of the first electronic device and for transmitting data via optical pulses;

a first optical receiver coupled to the data processor; and
data transmission logic, coupled to the data processor, for:
  providing a data transfer interface on the electronic device, wherein the data transfer interface supports processing of selected data by the processor;
  switching the illumination light source from an illumination mode to a data communication mode; and
  transmitting a data stream from the electronic device by encoding the data in optical pulses from said illumination light source;
first logic, coupled to the illumination light source and to the first optical receiver, for (a) initiating an authentication and configuration connection via a first data communication link that is an optical communication link and (b) transmitting a configuration request via the optical communication link and (c) receiving a configuration response via the optical communication link to establish and configure a data communication connection over a second data communication link;
wherein said first logic further comprises logic for transmitting the configuration request from the first electronic device by sending optical pulses from the illumination light source of the device, wherein said configuration request is encoded within the optical transmission and transmitted over the optical communication link, and said configuration request includes one or more of (a) configuration information, (b) context information, (c) authentication/security information for establishing the data communication link, and (d) encryption/decryption information for data to be transferred on the second data communication link;
wherein the authentication and configuration connection is established with a second electronic device having a second optical receiver and an optical data transmission mechanism for respectively receiving and transmitting information via the optical communication link; and
wherein the first logic includes logic for responding to receipt, via the optical communication link, of the configuration response to said configuration request, which configuration response indicates approval of data communication via the second data communication link, by enabling data to be communicated over the second data communication link.

18. The data communication system of claim 17, wherein:
the optical communication link is a bidirectional duplex communication link created with the second optical receiver and the optical data transmission mechanism of the second electronic device;
the configuration request is transmitted via the optical pulses from the first device and is received by the second optical receiver of the second device;
the configuration response is transmitted from the second device and is received by the first optical receiver of the first device; and
said first logic comprises logic for:
  transmitting from the first device via the optical pulses over the communication link, a request for authentication data from the second device to authenticate the second device;
  comparing authentication data received in response to said request against a pre-established authentication parameter required for establishing the second data communication link, wherein the authentication data is one or more of (a) a password (b) a biometric sensor input and (c) an electronic token; and
  enabling transmission of data between the first device to the second device on the second data communication link following authentication, wherein data is only transmitted on the second data communication link after authentication of at least the second device.

19. The data communication system of claim 17, wherein:
said first logic further comprises logic for:
  generating said configuration request with at least one of:
    (a) security data for enabling secure data transmission over the second data communication link, wherein the configuration response that is received in response to a configuration request having security data for enabling secure data transmission over the second data communication link signals one or more of: (1) authorization to establish said second data communication link and complete data communication on the second data communication link; and (2) set up of a secure channel on the second data communication link for completing secure data communication; and
    (b) a query for return of corresponding security data from a second device receiving the configuration request, wherein the configuration response that is received in response to the configuration request with a query for return of corresponding security data includes second device security authentication and wherein data communication on the second data communication link is enabled following a receipt and confirmation of the corresponding security data;
  generating said configuration request with communication protocols for supporting data communication over the second data communication link;
  wherein said configuration response includes confirmation of a configuration set up of the second device to support data communication over the second data communication link via the communication protocols;
  providing within the configuration request transmitted over the optical communication link, one or more of (a) data encryption and decryption information for data to be transmitted over the second communication link and (b) token information that provides access to a trusted link to consume data from a third device, said trusted link being the second communication link, wherein said token information may be passed to multiple second electronic devices to enable each of the multiple second electronic devices to have access to consume the data from the third device;
  receiving, via the optical communication link, information required to enable communication of data on a second data communication link from a content provider, wherein said data is communicated encoded with encryption information corresponding to decryption information received on the optical communication link;
  receiving a second request for connection, configuration and authentication information via the first optical receiver; and
  responding to a receipt of said request for second connection, configuration and authentication information by: (a) generating a configuration response including therein requested connection, configuration and authentication information; and (b) forwarding the requested information via the optical communication link to complete configuration of a second channel for data transmission over the second data communication link being established; and said second logic further comprising logic for:
encoding data to be communicated over the second data communication link with the encryption information communicated via the optical communication link; and
configuring the second communication link according to the received second connection, configuration and authentication information, wherein said device is configured to support further data communication with a second device via the second communication link using the second connection, configuration and authentication information.

20. The data communication system of claim 17, said first logic further comprising one or more of:
logic for receiving, from a second electronic device via the optical communication link, information required to enable communication of data on a second data communication link with a content provider, wherein said data is communicated encoded with encryption information transmitted on the optical communication link; and
logic for receiving from the second electronic device via the optical communication link, token information required to consume data that is transmitted on the second data communication link by a content provider, wherein said data may only be consumed with the token information transmitted on the optical communication link.

21. A method for providing data communication with an electronic device having a first optical receiver and an illumination light source, said method comprising:
providing a data transfer interface on the electronic device, wherein the data transfer interface supports processing of selected data by a processor of the electronic device;
switching an illumination light source of the electronic device from an illumination mode to a data communication mode;
initiating an authentication and configuration connection via a first data communication link that is an optical communication link;
transmitting a configuration request and receiving a configuration response via the optical communication link to establish and configure a data communication channel over a second data communication link, wherein said transmitting includes transmitting the configuration request from the device by sending optical pulses from the illumination light source of the device, wherein said configuration request is encoded within the optical transmission and transmitted over the optical communication link, and said configuration request includes one or more of (a) configuration information, (b) context information, (c) authentication/security information for establishing the data communication link, and (d) encryption/decryption information for data to be transferred on the second data communication link;
receiving, via the optical receiver, a configuration response transmitted over the optical communication link, which configuration response includes information required to establish and configure a data communication channel over the second data communication link;
wherein the authentication and configuration connection is established with a second electronic device having a second optical receiver; and
responding to a receipt of the configuration response to said configuration request, indicating approval of data communication via the second data communication link, by enabling data to be communicated over the second data communication link.

22. The method of claim 21, further comprising:
generating said configuration request with at least one of:
(a) security data for enabling secure data transmission over the second data communication link, wherein the configuration response that is received in response to a configuration request having security data for enabling secure data transmission over the second data communication link signals one or more of: (1) authorization to establish said second data communication link and complete data communication on the second data communication link; and (2) set up of a secure channel on the second data communication link for completing secure data communication; and
(b) a query for return of corresponding security data from a second device receiving the configuration request, wherein the configuration response that is received in response to the configuration request with a query for return of corresponding security data includes second device security authentication and wherein data communication on the second data communication link is enabled following a receipt and confirmation of the corresponding security data;
generating said configuration request with communication protocols for supporting data communication over the second data communication link;
wherein said configuration response includes confirmation of a configuration set up of the second device to support data communication over the second data communication link via the communication protocols;
providing, within the configuration request transmitted over the optical communication link, one or more of (a) data encryption and decryption information for data to be transmitted over the second communication link and (b) token information that provides access to a trusted link to consume data from a third device, said trusted link being the second communication link, wherein said token information may be passed to multiple second electronic devices to enable each of the multiple second electronic devices to have access to consume the data from the third device;
receiving, via the optical communication link, information required to enable communication of data on a second data communication link from a content provider, wherein said data is communicated encoded with encryption information corresponding to decryption information received on the optical communication link;
receiving a second request for connection, configuration and authentication information via the optical receiver;
responding to a receipt of said request for second connection, configuration and authentication information by: (a) generating a configuration response including therein requested connection, configuration and authentication information; and (b) forwarding the requested information via the optical communication link to complete configuration of a second channel for data transmission over a second data communication link being established;
encoding data to be communicated over the second data communication link utilizing the encryption information that was communicated via the optical communication link; and
configuring the second communication link according to the second connection, configuration and authentication information, wherein said device is configured to support further data communication with a second device via the second communication link using the second connection, configuration and authentication information.

23. The method of claim 21, further comprising:

transmitting from the first device via the optical pulses over the communication link, a request for authentication data from the second device to authenticate the second device;

comparing authentication data received in response to said request against a pre-established authentication parameter required for establishing the second data communication link, wherein the authentication data is one or more of (a) a password (b) a biometric sensor input and (c) an electronic token; and enabling transmission of data between the first device to the second device on the second data communication link following authentication, wherein data is only transmitted on the second data communication link after authentication of at least the second device.

* * * * *